(12) United States Patent
Bunazawa et al.

(10) Patent No.: US 11,796,054 B2
(45) Date of Patent: Oct. 24, 2023

(54) ANOMALY DETERMINATION DEVICE FOR POWER TRANSMISSION DEVICE

(71) Applicant: TOYOTA JIDOSHA KABUSHIKI KAISHA, Toyota (JP)

(72) Inventors: Hideaki Bunazawa, Nagoya (JP); Tetsuya Yoshikawa, Toyota (JP); Kei Yuasa, Toyota (JP); Kenichi Yamaguchi, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 17/358,487

(22) Filed: Jun. 25, 2021

(65) Prior Publication Data

US 2022/0042596 A1 Feb. 10, 2022

(30) Foreign Application Priority Data

Aug. 4, 2020 (JP) ................................ 2020-132246

(51) Int. Cl.
*F16H 61/12* (2010.01)
*F16D 66/00* (2006.01)

(52) U.S. Cl.
CPC ............ *F16H 61/12* (2013.01); *F16D 66/00* (2013.01); *F16D 2066/001* (2013.01); *F16D 2066/008* (2013.01); *F16H 2061/128* (2013.01)

(58) Field of Classification Search
CPC .............. F16H 61/12; F16H 2061/128; F16H 2061/1276; F16D 66/00; F16D 2066/001; F16D 2066/008
See application file for complete search history.

(56) References Cited

U.S. PATENT DOCUMENTS

| 5,803,197 | A | * | 9/1998 | Hara | ................ | B60K 23/0808 |
| | | | | | | 180/248 |
| 2010/0168954 | A1 | * | 7/2010 | Inoue | .................... | F16H 61/12 |
| | | | | | | 701/31.4 |
| 2015/0300423 | A1 | * | 10/2015 | Takeda | ................ | B60K 6/442 |
| | | | | | | 180/65.23 |

FOREIGN PATENT DOCUMENTS

JP 2011-058510 A 3/2011

* cited by examiner

*Primary Examiner* — Edwin A Young
(74) *Attorney, Agent, or Firm* — Oliff PLC

(57) ABSTRACT

A storage device stores a mapping data entry that specifies a mapping and includes data learned through machine learning. A detection value of an oil temperature sensor is an oil temperature detection value. When oil temperature relation data, which is data corresponding to time series data of the oil temperature detection value, is input to the mapping as an input variable, the mapping outputs an output variable that determines whether a frictional engagement element has an anomaly. Processing circuitry executes an obtainment process that obtains the input variable and an anomaly determination process that determines whether the frictional engagement element has an anomaly based on the output variable that is output from the mapping as a result of inputting the input variable obtained in the obtainment process into the mapping.

15 Claims, 9 Drawing Sheets

ANOMALY DETERMINATION DEVICE FOR POWER TRANSMISSION DEVICE

BACKGROUND

1. Field

The following description relates to an anomaly determination device for a power transmission device including a frictional engagement element that determines whether the frictional engagement element has an anomaly.

2. Description of Related Art

Japanese Laid-Open Patent Publication No. 2011-58510 discloses an example of a power transmission device that includes a frictional engagement element such as a clutch or a brake. In such a power transmission device, when an anomaly occurs in the frictional engagement element and advances deterioration of oil circulating in the power transmission device, the oil emits a distinctive odor. When deterioration of oil circulating in the power transmission device advances due to the anomaly of the frictional engagement element, the odor components of the oil will change from those when the frictional engagement element has no anomaly and the oil has not deteriorated.

In the patent document described above, an odor sensor is arranged in an oil pan storing the oil to detect the components of odor emitted from the oil. Thus, an anomaly in the power transmission device is predicted based on a detection value of the sensor.

In order to predict an anomaly in the power transmission device using the above method, a detection value of the odor sensor is necessary. Therefore, there is a need for a technique that detects an anomaly in a frictional engagement element without using a detection value of an odor sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure and their operation and advantages are as follows.

Aspect 1. An anomaly determination device for a power transmission device is used for a vehicle including the power transmission device and an oil temperature sensor. The power transmission device includes a frictional engagement element and is configured to transmit power output from a power source of the vehicle to a driving wheel. The oil temperature sensor is configured to detect an oil temperature, which is a temperature of oil circulating in the power transmission device. The anomaly determination device includes processing circuitry and a storage device. The storage device stores a mapping data entry that specifies a mapping and includes data learned through machine learning. A detection value of the oil temperature sensor is an oil temperature detection value. When oil temperature relation data, which is data corresponding to time series data of the oil temperature detection value, is input to the mapping as an input variable, the mapping outputs an output variable that determines whether the frictional engagement element has an anomaly. The processing circuitry is configured to execute an obtainment process that obtains the input variable and an anomaly determination process that determines whether the frictional engagement element has an anomaly based on the output variable that is output from the mapping as a result of inputting the input variable obtained in the obtainment process into the mapping.

When heat is generated in the frictional engagement element during operation of the power transmission device, the heat may be transferred to oil circulating in the power transmission device and change the oil temperature, that is, the temperature of the oil.

The amount of heat generated by the frictional engagement element differs between when the frictional engagement element has an anomaly and when the frictional engagement element has no anomaly. Changes in the heat generation amount cause the oil temperature to change differently. Therefore, whether the frictional engagement element has an anomaly is predicted by analyzing the oil temperature relation data corresponding to time series data of the oil temperature detection value.

In the configuration described above, the storage device stores a mapping data entry that specifies a mapping. The mapping receives the oil temperature relation data as an input variable and outputs an outputs variable that determines whether the frictional engagement element has an anomaly. During operation of the power transmission device, it is determined whether the frictional engagement element has an anomaly based on an output variable that is output from the mapping as a result of inputting an obtained input variable into the mapping. This configuration allows for determination of whether the frictional engagement element has an anomaly without using a detection value of an odor sensor.

Aspect 2. In the anomaly determination device according to aspect 1, the obtainment process includes a detection value obtainment process and a relation data generation process. The detection value obtainment process obtains time series data of the oil temperature detection value including multiple of the oil temperature detection value that are detected in each detection cycle within a predetermined measurement period. The relation data generation process normalizes the multiple of the oil temperature detection value included in the time series data of the oil temperature detection value to generate the oil temperature relation data.

Time series data of the oil temperature detection value when the frictional engagement element has an anomaly differs from time series data of the oil temperature detection value when the frictional engagement element has no anomaly. The degree of the difference may differ between when the oil temperature detection value is relatively large and when the oil temperature detection value is relatively small. When time series data of the oil temperature detection value is used as an input variable of the mapping and the degree of the difference is relatively small, the accuracy of the determination is likely to be lower than when the degree of the difference is relatively large. In other words, the accuracy of the determination may vary in accordance with the magnitude of the oil temperature detection value.

In this regard, in the configuration described above, oil temperature relation data is input to the mapping as an input variable. The oil temperature relation data is normalized data of the time series data of the oil temperature detection value. Therefore, the degree of difference in the oil temperature relation data between when the frictional engagement element has an anomaly and when the frictional engagement element has no anomaly subtly changes between when the oil temperature detection value is relatively large and when the oil temperature detection value is relatively small. Thus, the use of the oil temperature relation data as the input variable of the mapping reduces variations in the determination accuracy caused by the magnitude of the oil temperature detection value.

Aspect 3. In the anomaly determination device according to aspect 2, a value obtained by normalizing the oil temperature detection value is a normalized oil temperature detection value. In the relation data generation process, the process circuitry is configured to normalize the multiple of the oil temperature detection value included in the time series data of the oil temperature detection value to derive time series data of the normalized oil temperature detection value including multiple of the normalized oil temperature detection value and generate, as the oil temperature relation data, data showing distribution of numerical magnitude of the multiple of the normalized oil temperature detection value included in time series data of the normalized oil temperature detection value.

In the configuration described above, the oil temperature relation data shows distribution of numerical magnitude of normalized oil temperature detection values included in time series data of the normalized oil temperature detection value. Variations in magnitude of the normalized oil temperature detection values may differ between when the frictional engagement element has no anomaly and when the frictional engagement element has an anomaly. Therefore, the oil temperature relation data is used as an input variable of the mapping to increase the accuracy of the determination.

Aspect 4. In the anomaly determination device according to any one of aspects 1 to 3, the input variable includes a vehicle speed.

The operating amount of the power transmission device at a relatively high vehicle speed differs from the operating amount of the power transmission device at a relatively low vehicle speed. When the operating amount of the power transmission device changes, the temperature of oil circulating in the power transmission device also changes. In this regard, in the configuration described above, the vehicle speed is used as an input variable of the mapping. That is, the mapping outputs an output variable considering the vehicle speed. The use of such an output variable increases the accuracy of the determination.

Aspect 5. In the anomaly determination device according to any one of aspects 1 to 4, the power transmission device includes a clutch as the frictional engagement element. The input variable includes at least one of a rotation speed of an input-side element of the clutch, a rotation speed of an output-side element of the clutch, or a rotation speed difference between the input-side element and the output-side element.

For example, when the clutch is in the engaged state, the amount of heat generated by the clutch may vary in accordance with the rotation speed of the input-side element, the rotation speed of the output-side element, and the rotation speed difference between the input-side element and the output-side element. In this regard, in the configuration described above, at least one of the rotation speed of the input-side element, the rotation speed of the output-side element, or the rotation speed difference is used as an input variable of the mapping. That is, the mapping outputs an output variable considering at least one of the rotation speed of the input-side element, the rotation speed of the output-side element, or the rotation speed difference. The use of such an output variable increases the accuracy of the determination.

Aspect 6. In the anomaly determination device according to any one of aspects 1 to 5, an input-output rotation speed difference is a rotation speed difference between an input portion that inputs torque to the frictional engagement element and an output portion that receives torque output from the frictional engagement element. The input variable includes a calculated value of a heat generation amount of the frictional engagement element that is calculated based on the product of torque input to the frictional engagement element and the input-output rotation speed difference.

The calculated value of the amount of heat generated by the frictional engagement element is calculated based on the assumption that the frictional engagement element has no anomaly. Therefore, the relationship between the calculated value of the heat generation amount and changes in the oil temperature detection value may differ between when the frictional engagement element has an anomaly and when the frictional engagement element has no anomaly. In this regard, in the configuration described above, the calculated value of the amount heat generation amount of the frictional engagement element is used as an input variable of the mapping. That is, the mapping outputs an output variable considering the calculated value of the heat generation amount. The use of such an output variable increases the accuracy of the determination.

Aspect 7. In the anomaly determination device according to any one of aspects 1 to 6, the input variable includes engagement force of the frictional engagement element.

The amount of heat generated by the frictional engagement element may differ, for example, between when engagement force of the frictional engagement element is relatively large and when the engagement force is relatively small. For example, when the engagement force is relatively small and the frictional engagement element is in sliding engagement, the frictional engagement element generates a larger amount of heat than when the engagement force is relatively large and the frictional engagement element is in complete engagement. In this regard, in the configuration described above, the engagement force of the frictional engagement element is used as an input variable of the mapping. That is, the mapping outputs an output variable considering the engagement force of the frictional engagement element. The use of such an output variable increases the accuracy of the determination.

Aspect 8. In the anomaly determination device according to any one of aspects 1 to 7, the input variable includes a pack clearance of the frictional engagement element.

In general engagement force for engaging the frictional engagement element is likely to increase as the pack clearance of the frictional engagement element is increased in amount. That is, when engaging the frictional engagement element, the heat generation amount may vary in accordance with the amount of the pack clearance. In this regard, in the configuration described above, the pack clearance of the frictional engagement element is used as an input variable of the mapping. That is, the mapping outputs an output variable considering the pack clearance of the frictional engagement element. The use of such an output variable increases the accuracy of the determination.

Aspect 9. In the anomaly determination device according to any one of aspects 1 to 8, the input variable includes a detection value of an acceleration sensor mounted on the vehicle.

When the frictional engagement element is engaged or disengaged, the operation of the frictional engagement element generates vibration in the power transmission device. The vibration generated in the power transmission device is detected by the acceleration sensor mounted on the vehicle. The detection value of the acceleration sensor may differ between when the frictional engagement element has an anomaly and when the frictional engagement element has no anomaly. In this regard, in the configuration described above, a detection value of the acceleration sensor is used as an input variable of the mapping. That is, the mapping outputs an output variable considering the detection value of the acceleration sensor. The use of such an output variable increases the accuracy of the determination.

Aspect 10. In the anomaly determination device according to any one of aspects 1 to 9, the mapping outputs an output variable that determines whether galling has occurred in the frictional engagement element. In the anomaly determination process, the processing circuitry is configured to determine whether galling has occurred in the frictional engagement element based on the output variable that is output from the mapping as a result of inputting the input variable obtained in the obtainment process into the mapping.

When the frictional engagement element is in the engaged state and galling occurs in the frictional engagement element, the amount of heat generated by the frictional engagement element changes from when galling has not occurred in the frictional engagement element. That is, the oil temperature detection value changes differently. Thus, the output variable output from the mapping is used to determine whether galling has occurred in the frictional engagement element.

Aspect 11. In the anomaly determination device according to any one of aspects 1 to 10, the mapping outputs an output variable that determines whether the frictional engagement element is in faulty engagement. In the anomaly determination process, the processing circuitry is configured to determine whether the frictional engagement element is in faulty engagement based on the output variable that is output from the mapping as a result of inputting the input variable obtained in the obtainment process into the mapping.

When the frictional engagement element is engaged and faulty engagement occurs, the amount of heat generated by the frictional engagement element changes from when faulty engagement does not occur. That is, the oil temperature detection value changes differently. Thus, the output variable output from the mapping is used to determine whether the frictional engagement element is in faulty engagement.

Aspect 12. In the anomaly determination device according to any one of aspects 1 to 11, the mapping outputs an output variable that determines whether seizing has occurred in the frictional engagement element. In the anomaly determination process, the processing circuitry is configured to determine whether seizing has occurred in the frictional engagement element based on the output variable that is output from the mapping as a result of inputting the input variable obtained in the obtainment process into the mapping.

When seizing has occurred in the frictional engagement element, the frictional engagement element cannot be disengaged. Thus, the amount of heat generated by the frictional engagement element differs between when seizing has occurred and when seizing has not occurred. That is, the oil temperature detection value changes differently. Thus, the output variable output from the mapping is used to determine whether seizing has occurred in the frictional engagement element.

Aspect 13. In the anomaly determination device according to any one of aspects 1 to 9, the storage device stores mapping data entries. The mapping data entries include a first mapping data entry, a second mapping data entry, and a third mapping data entry. The first mapping data entry specifies a mapping that outputs an output variable that determines whether galling has occurred in the frictional engagement element when the input variable is input. The second mapping data entry specifies a mapping that outputs an output variable that determines whether the frictional engagement element is in faulty engagement when the input variable is input. The third mapping data entry specifies a mapping that outputs an output variable that determines whether seizing has occurred in the frictional engagement element when the input variable is input.

In this configuration, the first mapping data entry is learned through machine learning that is specific to determination of whether galling has occurred in the frictional engagement element. The second mapping data entry is learned through machine learning that is specific to determination of whether the frictional engagement element is in faulty engagement. The third mapping data entry is learned through machine learning that is specific to determination of whether seizing has occurred in the frictional engagement element. In this case, when an input variable is input to a mapping specified by the first mapping data entry, the output variable output from the mapping is used to determine whether the frictional engagement element has an anomaly caused by galling. Also, when an input variable is input to a mapping specified by the second mapping data entry, the output variable output from the mapping is used to determine whether the frictional engagement element has an anomaly caused by faulty engagement. Also, when an input variable is input to a mapping specified by the third mapping data entry, the output variable output from the mapping is used to determine whether the frictional engagement element has an anomaly caused by seizing.

Aspect 14. In the anomaly determination device according to any one of aspects 1 to 12, the storage device stores mapping data entries separately corresponding to each operating state of the frictional engagement element. The mapping data entries include a first mapping data entry and a second mapping data entry. The first mapping data entry specifies a mapping that outputs an output variable that determines whether the frictional engagement element has an anomaly when the oil temperature relation data corresponding to the operating state of the frictional engagement element being a first operating state is input into the mapping as an input variable. The second mapping data entry specifies a mapping that outputs an output variable that determines whether the frictional engagement element has an anomaly when the oil temperature relation data corresponding to the operating state of the frictional engagement element being a second operating state that differs from the first operating state is input into the mapping as an input variable. The processing circuitry is configured to execute a data selection process that selects the mapping data entry corresponding to the operating state of the frictional engagement element from the mapping data entries stored in the storage device. In the anomaly determination process, the processing circuitry is configured to determine whether the frictional engagement element has an anomaly based on the output variable that is output from the mapping specified by the mapping data entry selected in the data selection process as a result of inputting the input variable obtained in the obtainment process into the mapping.

Even when the frictional engagement element has an anomaly, the oil temperature detection value may change differently if the frictional engagement element is in a different operating state. In the configuration described above, the first mapping data entry is learned through machine learning specific to when the operating state of the frictional engagement element is the first operating state. The second mapping data entry is learned through machine learning specific to when the operating state of the frictional engagement element is the second operating state. A mapping data entry that corresponds to the present operating state is selected from the mapping data entries, and an input variable is input to a mapping that is specified by the selected mapping data entry. Then, it is determined whether the frictional engagement element has an anomaly based on the output variable that is output from the mapping. Thus, the accuracy of the determination is increased by separately using the mapping data entries in accordance with the operating state.

Aspect 15. In the anomaly determination device according to any one of aspects 1 to 12, the storage device stores mapping data entries corresponding to a degree of deterioration in characteristic of the power transmission device. The processing circuitry is configured to execute a data selection process that selects the mapping data entry corresponding to the degree of deterioration in characteristic of the power transmission device from the mapping data entries stored in the storage device. In the anomaly determination process, the processing circuitry is configured to determine whether the frictional engagement element has an anomaly based on the output variable that is output from the mapping specified by the mapping data entry selected in the data selection process as a result of inputting the input variable obtained in the obtainment process into the mapping.

For example, even when the power transmission device has no anomaly, the amount of heat generated by the power transmission device may change in accordance with the degree of deterioration in the characteristics of the power transmission device. In the configuration described above, the mapping data entries are separately used in accordance with the degree of deterioration in the characteristics of the power transmission device. More specifically, a mapping data entry that corresponds to the degree of deterioration in the characteristics of the power transmission device is selected, and an input variable is input to a mapping that is specified by the selected mapping data entry. Then, it is determined whether the frictional engagement element has an anomaly based on the output variable that is output from the mapping. Thus, the accuracy of the determination is increased by separately using the mapping data entries in accordance with the degree of deterioration in the characteristics.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of an anomaly determination device for a power transmission device will now be described with reference to FIGS. 1 to 8.

A schematic configuration of a vehicle including the anomaly determination device will first be described.

Figure 1:
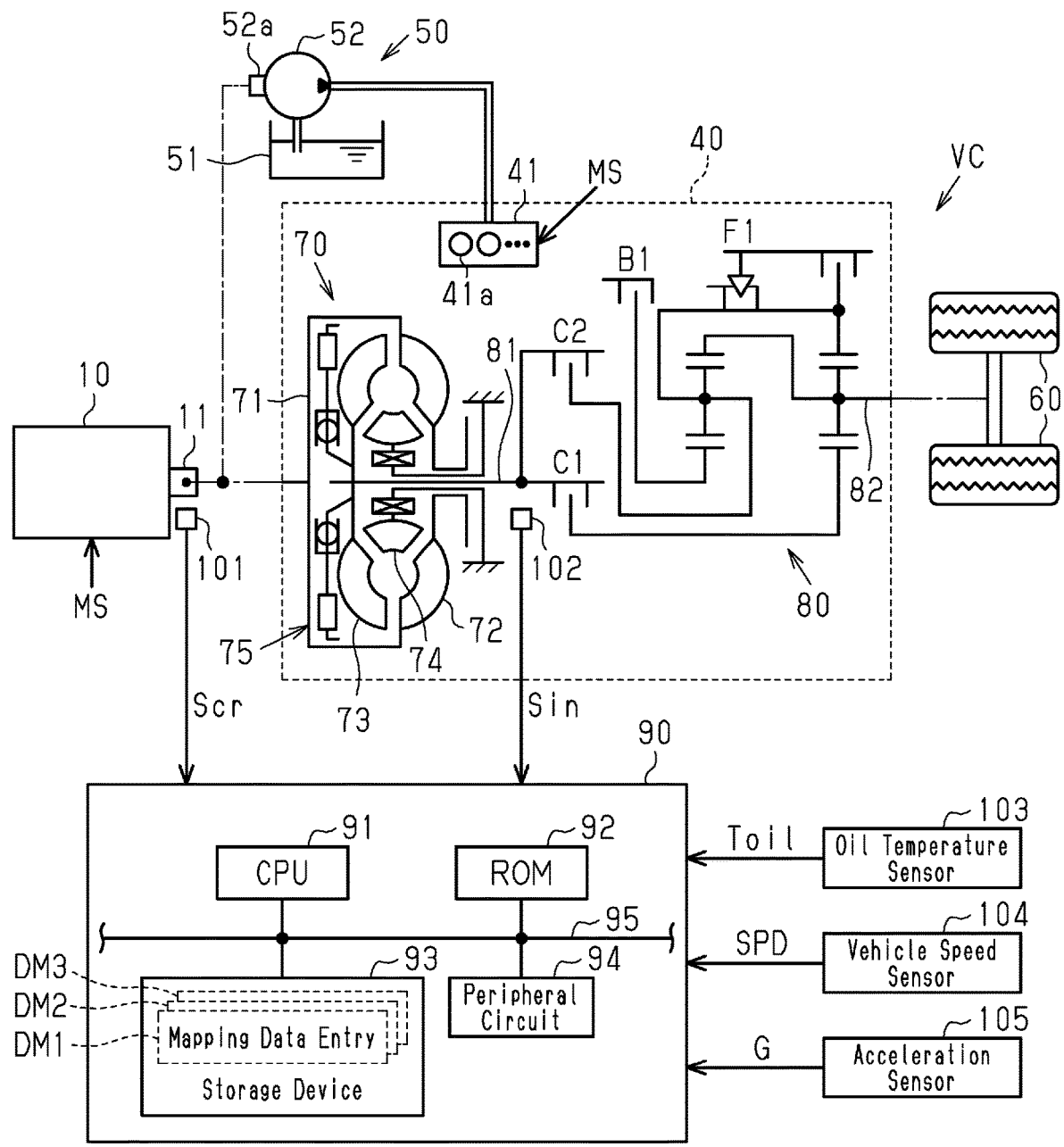
FIG. 1 is a diagram showing a controller and a drive system of a vehicle controlled by the controller in a first embodiment.

As shown in FIG. 1, a vehicle VC includes an internal combustion engine 10, a transmission 40, and driving wheels 60. The internal combustion engine 10 includes a crankshaft 11 coupled to a torque converter 70 of the transmission 40. The torque converter 70 is coupled to an input shaft 81 of a transmission mechanism 80. The driving wheels 60 are coupled to an output shaft 82 of the transmission mechanism 80 by a differential (not shown).

The torque converter 70 includes a front cover 71, a pump impeller 72, a turbine 73, and a stator 74. The front cover 71 is coupled to the crankshaft 11 of the internal combustion engine 10. The pump impeller 72 rotates integrally with the front cover 71. The turbine 73 rotates integrally with the input shaft 81 of the transmission 40. The stator 74 amplifies torque between the pump impeller 72 and the turbine 73. When the pump impeller 72 is rotating in accordance with the running of the engine, the rotation of the pump impeller 72 is transmitted to the turbine 73 through oil in the torque converter 70. As a result, output torque of the internal combustion engine 10 is input to the transmission mechanism 80.

The torque converter 70 includes a lock-up clutch 75. When the lock-up clutch 75 is in an engaged state, the lock-up clutch 75 mechanically connects the pump impeller 72 and the turbine 73. Thus, when the lock-up clutch 75 is in the engaged state, output torque of the internal combustion engine 10 is transmitted from the front cover 71 through the lock-up clutch 75 to the turbine 73 and is input to the transmission mechanism 80.

Figure 2:
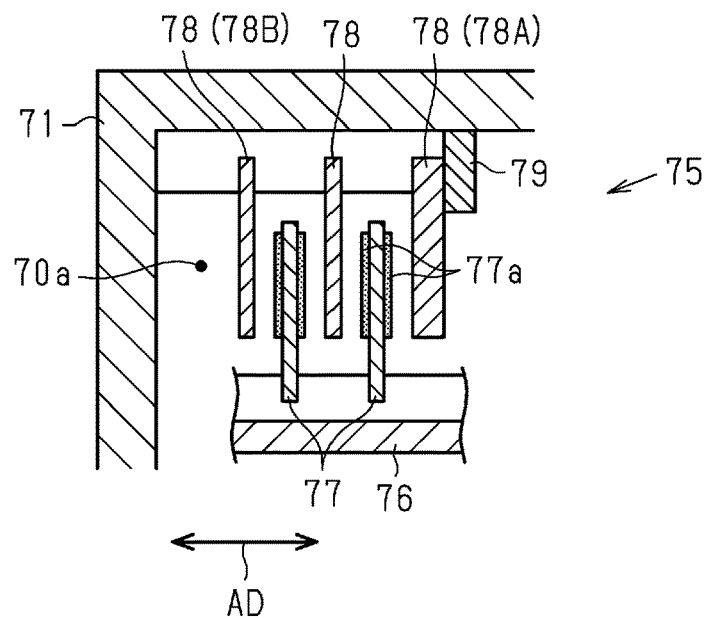
FIG. 2 is a schematic cross-sectional view showing part of a torque converter when a lock-up clutch is in a disengaged state.
Figure 3:
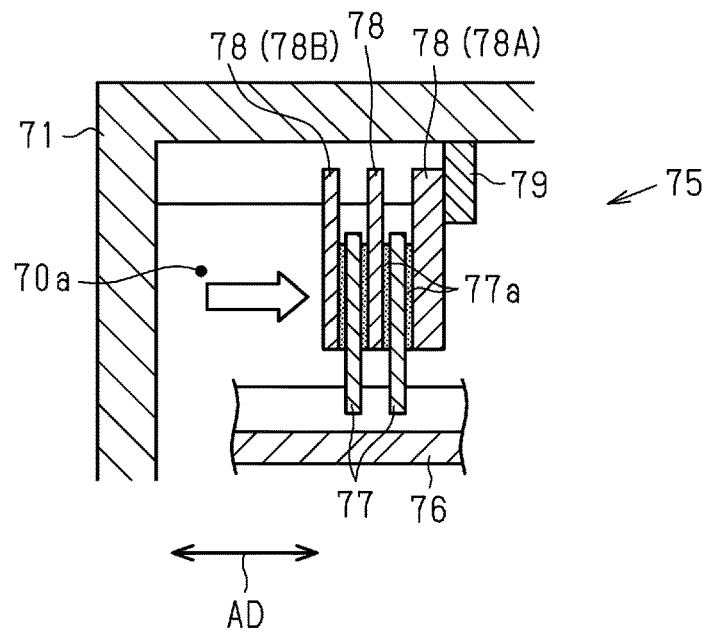
FIG. 3 is a schematic cross-sectional view showing part of the torque converter when the lock-up clutch is in an engaged state.

As shown in FIGS. 2 and 3, the lock-up clutch 75 includes a support 76 that rotates integrally with the turbine 73, output-side elements 77 supported in a manner rotatable integrally with the support 76, and input-side elements 78 supported by the front cover 71. When the direction in which the input shaft 81 of the transmission mechanism 80 extends, which conforms to the sideward direction in FIGS. 2 and 3, is referred to as an axial direction AD, the input-side elements 78 are slidable relative to the front cover 71 in the axial direction AD. However, a stopper 79 restricts the sliding of an input-side element 78A, which is the closest one of the input-side elements 78 to the turbine 73, toward the turbine 73 (i.e., rightward in FIGS. 2 and 3) in the axial direction AD.

The output-side elements 77 are supported by the support 76 and are slidable in the axial direction AD. Friction members 77a are applied to opposite surfaces of each output-side element 77. The output-side elements 77 are arranged so that each output-side element 77 is located between adjacent ones of the input-side elements 78 in the axial direction AD.

The lock-up clutch 75 is shifted to the engaged state and the disengaged state by adjustment of the hydraulic pressure of a pressure adjustment region 70a in the torque converter 70. More specifically, when the hydraulic pressure of the pressure adjustment region 70a is increased in the state shown in FIG. 2, the output-side elements 77 and the input-side elements 78 except the input-side element 78A slide toward the turbine 73 (rightward in FIG. 2) in the axial direction AD. As a result, as shown in FIG. 3, the operating state of the lock-up clutch 75 is shifted to the engaged state, and adjacent ones of the input-side elements 78 and the output-side elements 77 in the axial direction AD are forced onto each other. When the hydraulic pressure of the pressure adjustment region 70a is reduced in the state shown in FIG. 3, adjacent ones of the input-side elements 78 and the output-side elements 77 are separated from each other. As a result, as shown in FIG. 2, the operating state of the lock-up clutch 75 is shifted to the disengaged state.

Among the input-side elements 78, the input-side element 78 located farthest from the turbine 73 in the axial direction AD is referred to as an "input-side element 78B." When the operating state of the lock-up clutch 75 is shifted from the disengaged state, which is shown in FIG. 2, to the engaged state, which is shown in FIG. 3, the slide amount of the input-side element 78B is greater than the slide amount of the other input-side elements 78 and the output-side elements 77. In the present embodiment, when the operating state of the lock-up clutch 75 is shifted from the disengaged state to the engaged state, the slide amount of the input-side element 78B is referred to as a "pack clearance PCtc of the lock-up clutch 75."

As shown in FIG. 1, the transmission mechanism 80 includes a first clutch C1, a second clutch C2, a brake mechanism B1, and a one-way clutch F1. The transmission stage of the transmission 40 is changed in accordance with a combination of the engaged state and the disengaged state in the first clutch C1, the second clutch C2, and the brake mechanism B1, and a combination of a restriction state and a permission state of the one-way clutch F1.

The vehicle VC includes an oil supply unit 50 that supplies oil to the transmission 40. The oil supply unit 50 includes an oil pan 51 storing the oil and a mechanically-driven oil pump 52. The oil pump 52 includes a driven shaft 52a coupled to the crankshaft 11 of the internal combustion engine 10. The oil pump 52 draws in oil from the oil pan 51 and discharges the oil to the transmission 40. The pressure of the oil discharged from the oil pump 52 is adjusted by a hydraulic pressure control circuit 41 of the transmission 40. The hydraulic pressure control circuit 41 includes solenoid valves 41a. The hydraulic pressure control circuit 41 energizes each solenoid valve 41a to control a flowing state of the oil and the pressure of the oil.

The internal combustion engine 10 is controlled by a controller 90, which operates various operating units of the internal combustion engine 10 to control torque, an exhaust component, and other control aspects of the internal combustion engine 10. The controller 90 also controls the transmission 40 and operates the solenoid valves 41a of the hydraulic pressure control circuit 41.

When controlling the control aspects described above, the controller 90 refers to an output signal Scr of a crank angle sensor 101 and an output signal Sin of an input shaft rotational angle sensor 102, which detects a rotational angle of the input shaft 81 of the transmission 40. The controller 90 also refers to an oil temperature detection value Toil, which is an oil temperature detected by an oil temperature sensor 103, a vehicle speed SPD, which is a moving speed of the vehicle VC detected by a vehicle speed sensor 104, and a vehicle acceleration G, which is acceleration of the vehicle VC detected by an acceleration sensor 105.

The controller 90 includes a central processing unit (CPU) 91, a read-only memory (ROM) 92, a storage device 93, which is an electrically rewritable nonvolatile memory, and a peripheral circuit 94, which are configured to communicate with each other through a local network 95. The peripheral circuit 94 includes, for example, a circuit that generates a clock signal regulating an internal operation, a power supply circuit, and a reset circuit. The controller 90 controls the control aspects by causing the CPU 91 to execute programs stored in the ROM 92.

The storage device 93 stores mapping data entries DM1, DM2, and DM3. Each of the mapping data entries DM1, DM2, and DM3 includes data specifying a mapping that outputs an output variable corresponding to one of the various input variables (described later) when the input variable is input. The data is learned through machine learning.

During operation of the transmission 40, an anomaly may occur in the lock-up clutch 75 of the transmission 40. Possible anomalies of the lock-up clutch 75 include the following:

galling of the lock-up clutch 75;
faulty engagement of the lock-up clutch 75; and
seizing of the lock-up clutch 75.

When the lock-up clutch 75 is in the engaged state and the lock-up clutch 75 is normal, the friction members 77a of the output-side elements 77 are forced onto the input-side elements 78. Since the input-side elements 78 and the output-side elements 77 are formed from metal, the friction members 77a are forced onto metal (input-side elements 78). As wear of the friction members 77a advances, the surfaces of the output-side elements 77 start to be exposed.

In this state, when the lock-up clutch 75 is engaged, the output-side elements 77 will directly contact the input-side elements 78. That is, the friction members are not forced onto the metal (input-side elements 78), but metal (output-side elements 77) is forced onto metal (input-side elements 78). As a result, galling may occur in the lock-up clutch 75. The amount of heat generated by the lock-up clutch 75 differs between when metal is forced onto metal and when the friction members are forced onto metal.

The hydraulic pressure of the pressure adjustment region 70a in the torque converter 70 is adjusted when shifting the operating state of the lock-up clutch 75 to the engaged state and the disengaged state. For example, when an anomaly occurs in the hydraulic pressure control circuit 41, the hydraulic pressure of the pressure adjustment region 70a cannot be appropriately adjusted. This may result in a failure to appropriately control the operating state of the lock-up clutch 75. More specifically, when shifting the operating state of the lock-up clutch 75 to the engaged state, if the hydraulic pressure of the pressure adjustment region 70a cannot be sufficiently increased, faulty engagement may result such that the force pushing the output-side elements 77 onto the input-side elements 78 is insufficient. The faulty engagement allows the output-side elements 77 to slide on the input-side elements 78 and decreases the torque transmission efficiency of the lock-up clutch 75. When the engagement force is increased, the sliding of the output-side elements 77 on the input-side elements 78 is restricted. When the output-side elements 77 slide on the input-side elements 78, the lock-up clutch 75 generates a larger amount of heat than when the output-side elements 77 do not slide on the input-side elements 78.

When shifting the operating state of the lock-up clutch 75 from the engaged state to the disengaged state, if the hydraulic pressure of the pressure adjustment region 70a cannot be decreased due to an anomaly in the hydraulic pressure control circuit 41, the lock-up clutch 75 may remain in the engaged state. A state in which the lock-up clutch 75 remains in the engaged state regardless of an attempt to shift the operating state of the lock-up clutch 75 to the disengaged state is referred to as seizing of the lock-up clutch 75. When the lock-up clutch 75 seizes, the lock-up clutch 75 generates a larger amount of heat than when the operating state of the lock-up clutch 75 is shifted normally to the disengaged state.

When the lock-up clutch 75 has an anomaly such as those described above, the oil temperature, that is, the temperature of the oil circulating in the transmission 40, changes differently from when the lock-up clutch 75 has no anomaly. In the present embodiment, the controller 90 determines whether the lock-up clutch 75 has an anomaly based on changes in the oil temperature detection value Toil. In this process, the controller 90 uses the mapping data entries DM1, DM2, and DM3 stored in the storage device 93.

In the present embodiment, the mapping data entry DM1 specifies a mapping that outputs an output variable Y(1) determining whether galling has occurred in the lock-up clutch 75. The mapping data entry DM2 specifies a mapping that outputs an output variable Y(2) determining whether the lock-up clutch 75 is in faulty engagement. The mapping data entry DM3 specifies a mapping that outputs an output variable Y(3) determining whether the seizing of the lock-up clutch 75 has occurred.

Figure 4:
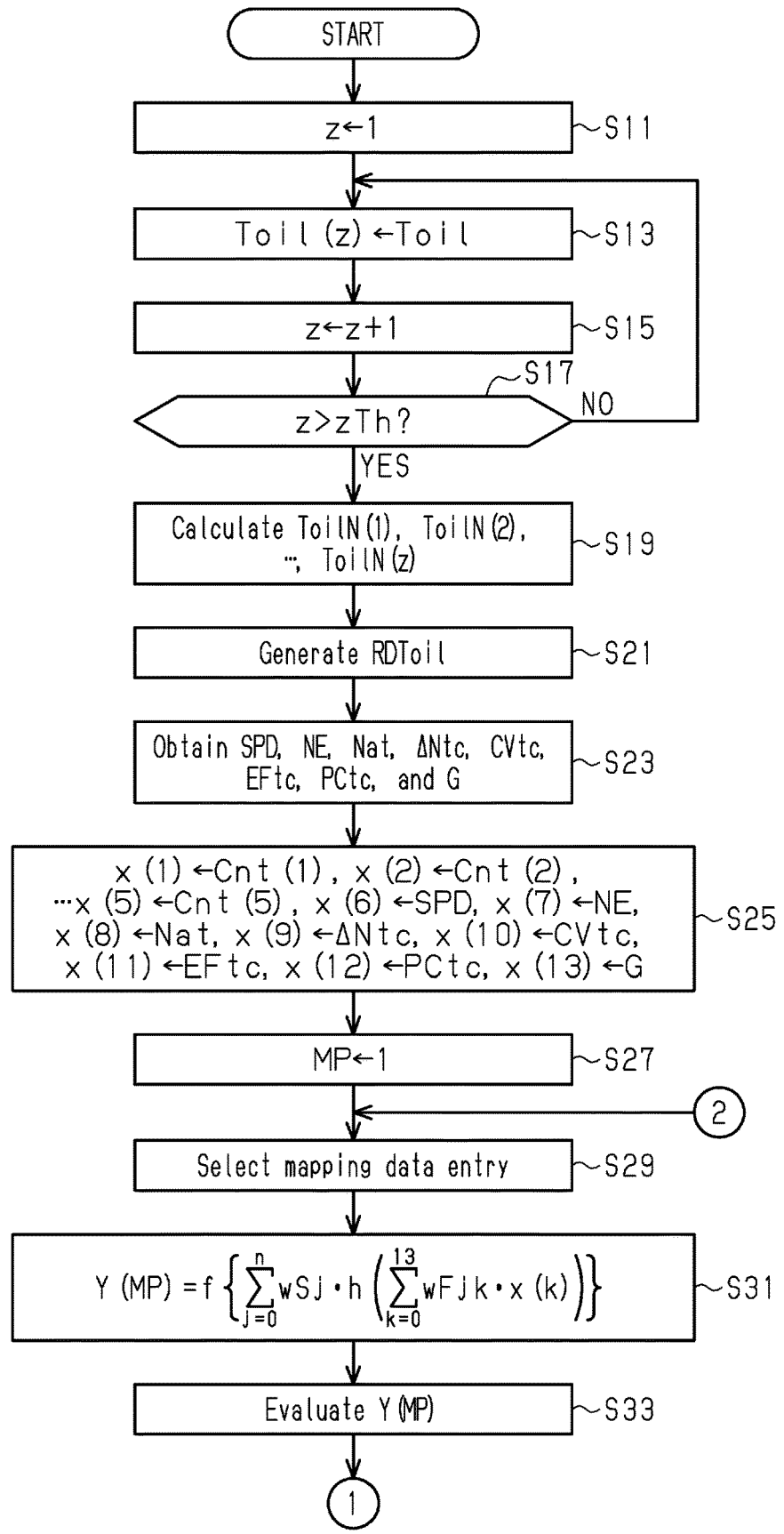
FIG. 4 is the first half of a flowchart showing a series of processes executed by the controller.
Figure 5:
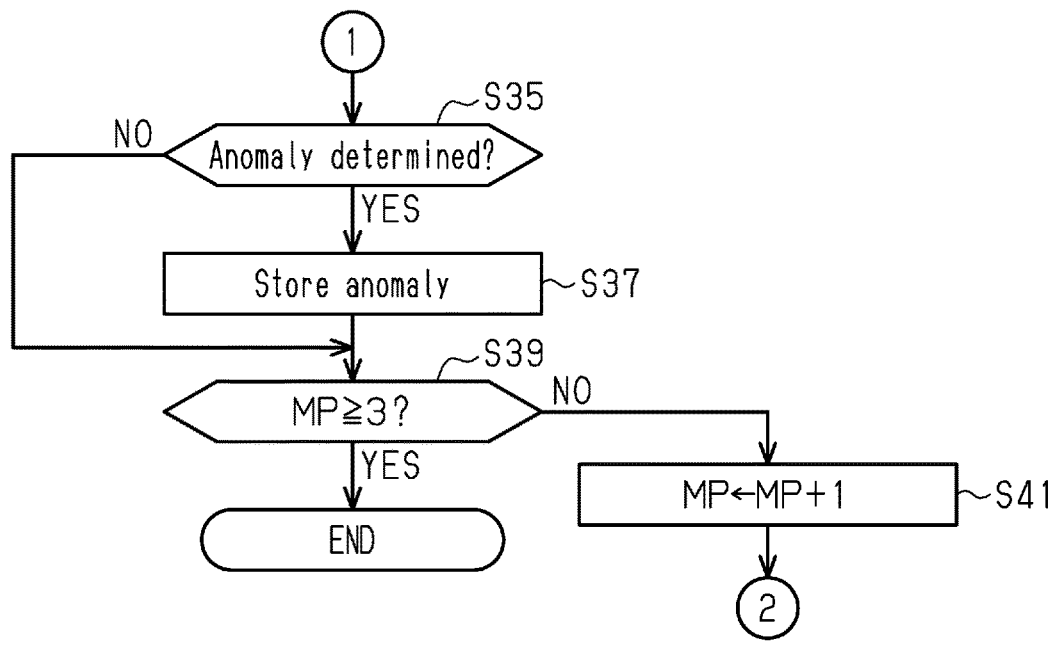
FIG. 5 is the second half of the flowchart showing the series of processes executed by the controller.

The procedure of a series of processes executed by the controller 90 for determining whether the lock-up clutch 75 has an anomaly will now be described with reference to FIGS. 4 and 5. The series of processes shown in FIGS. 4 and 5 is implemented by the CPU 91 when executing the programs stored in the ROM 92. The series of processes is repeatedly executed in a predetermined cycle. More specifically, when a time elapsed from when the series of processes temporarily ends reaches the time corresponding to the predetermined cycle, the CPU 91 again starts to execute the series of processes.

In step S11, the CPU 91 sets a coefficient z to one. Next, in step S13, the CPU 91 obtains the present oil temperature detection value Toil as an oil temperature detection value Toil(z). Next, in step S15, the CPU 91 increments the coefficient z by one. In step S17, the CPU 91 determines whether the coefficient z is greater than a coefficient determination value zTh. In the present embodiment, time series data of oil temperature detection values Toil is used to determine whether the lock-up clutch 75 has an anomaly. The time series data of oil temperature detection values Toil includes oil temperature detection values Toil that are consecutive in time order. The coefficient determination value zTh is set to be a determination reference that determines whether the number of oil temperature detection values Toil necessary for the determination have been obtained. If the coefficient z is less than or equal to the coefficient determination value zTh (S17: NO), the CPU 91 proceeds to step S13. That is, the oil temperature detection value Toil continues to be obtained. If the coefficient z is greater than the coefficient determination value zTh (S17: YES), time series data of oil temperature detection values Toil including "z" oil temperature detection values Toil has been obtained, and the CPU 91 proceeds to step S19.

In step S19, the CPU 91 normalizes the time series data of oil temperature detection values Toil. For example, among the oil temperature detection values Toil(1), Toil(2), . . . , and Toil(z) included in the time series data of oil temperature detection values Toil, the CPU 91 sets the largest value as a reference oil temperature detection value ToilB. The CPU 91 divides each of the oil temperature detection values Toil(1), Toil(2), . . . , and Toil(z) by the reference oil temperature detection value ToilB to normalize the oil temperature detection values Toil(1), Toil(2), . . . , and Toil(z). The normalized oil temperature detection values Toil(1), Toil(2), . . . , and Toil(z) are referred to as normalized oil temperature detection values ToilN(1), ToilN(2), . . . , and ToilN(z). For example, the normalized oil temperature detection value ToilN(1) is obtained by dividing the oil temperature detection value Toil(1) by the reference oil temperature detection value ToilB. Data including the normalized oil temperature detection values ToilN(1), ToilN(2), . . . , and ToilN(z) may also be referred to as "time series data of normalized oil temperature detection values ToilN."

In step S21, the CPU 91 generates oil temperature relation data RDToil based on the time series data of normalized oil temperature detection values ToilN. In the present embodiment, each of the normalized oil temperature detection values ToilN(1), ToilN(2), . . . , and ToilN(z) is greater than zero and less than or equal to one. A range of numeral values from zero to one is split into split ranges. For example, the range of numeral values from zero to one is split at intervals of 0.2. For each split range, the CPU 91 counts the number of normalized oil temperature detection values ToilN included in the split range. For example, when the normalized oil temperature detection values ToilN(1), ToilN(2), and ToilN(z) include four normalized oil temperature detection values ToilN that are greater than 0.4 and less than or equal to 0.6, the CPU 91 determines that the number of normalized oil temperature detection values ToilN included in a split range from 0.4 to 0.6 is four. The CPU 91 calculates the count result for each split range, which is obtained as described above, as the oil temperature relation data RDToil. More specifically, the oil temperature relation data RDToil shows the distribution of numerical magnitude of the normalized oil temperature detection values ToilN(1), ToilN(2), . . . , and ToilN(z) included in the time series data of normalized oil temperature detection values ToilN.

For example, the CPU 91 uses the number of normalized oil temperature detection values ToilN included in the range from 0 to 0.2 as a count value Cnt(1) and uses the number of normalized oil temperature detection values ToilN included in the range from 0.2 to 0.4 as a count value Cnt(2). Also, the CPU 91 uses the number of normalized oil temperature detection values ToilN included in the range from 0.4 to 0.6 as a count value Cnt(3) and uses the number of normalized oil temperature detection values ToilN included in the range from 0.6 to 0.8 as a count value Cnt(4). The CPU 91 uses the number of normalized oil temperature detection values ToilN included in the range from 0.8 to 1 as a count value Cnt(5). That is, the oil temperature relation data RDToil includes the count values Cnt(1), Cnt(2), Cnt (3), Cnt(4), and Cnt(5).

Figure 6:
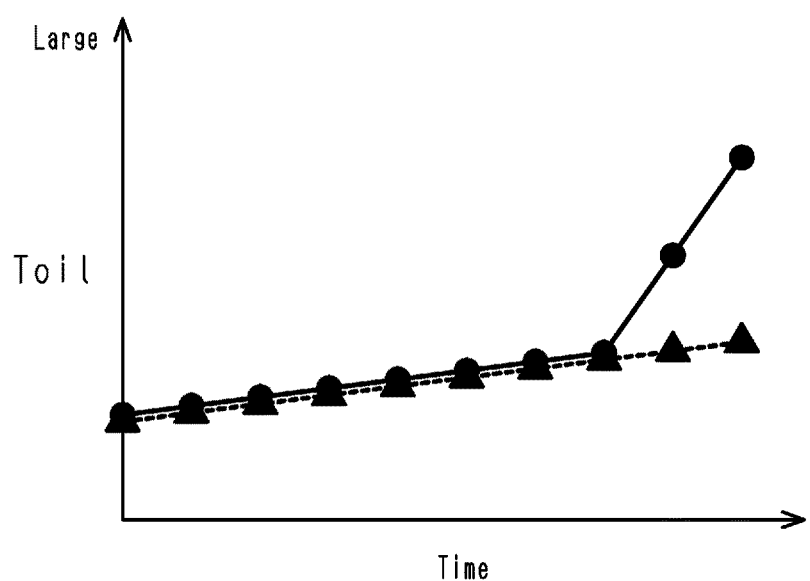
FIG. 6 is a graph showing changes in oil temperature detection value.
Figure 7:
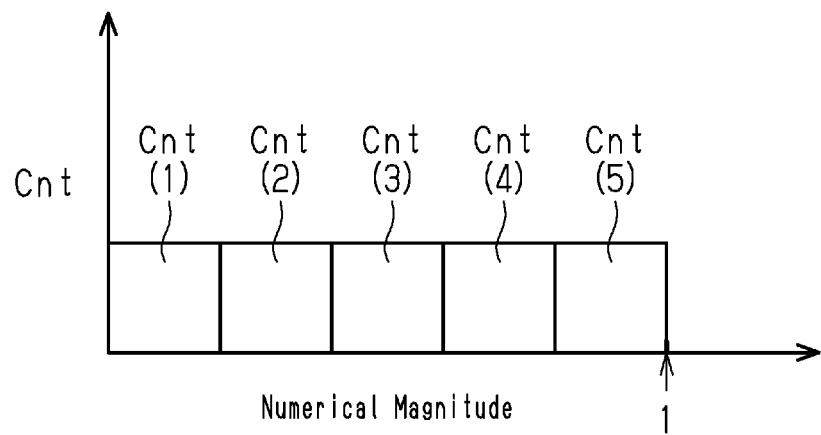
FIG. 7 is a graph showing a histogram of oil temperature relation data.
Figure 8:
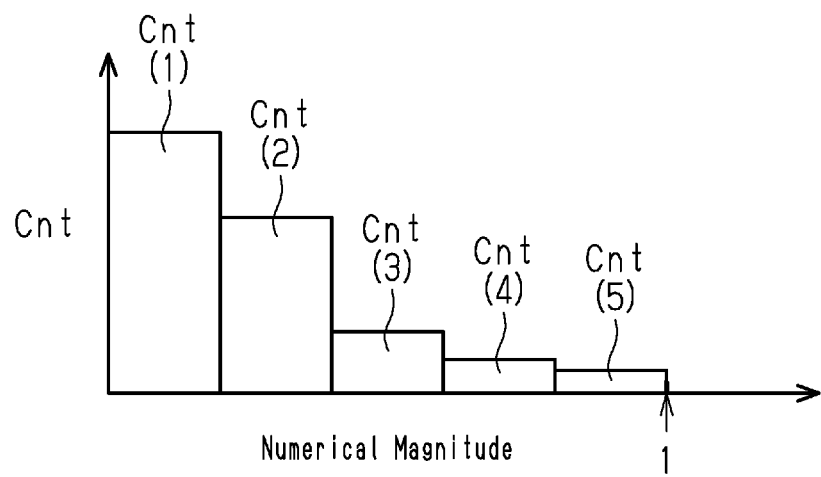
FIG. 8 is a graph showing a histogram of oil temperature relation data.

In FIG. 6, each of the solid line and the broken line shows time series data of oil temperature detection values Toil. FIG. 7 is a histogram of the oil temperature relation data RDToil that is generated based on the time series data of oil temperature detection values Toil shown by the broken line in FIG. 6. FIG. 8 is a histogram of the oil temperature relation data RDToil that is generated based on the time series data of oil temperature detection values Toil shown by the solid line in FIG. 6. The time series data of oil temperature detection values Toil shown by the broken line in FIG. 6 shows that the oil temperature detection value Toil is slowly increased at a substantially constant rate. Therefore, the oil temperature relation data RDToil shown in FIG. 7 has small variations in the count values Cnt(1) to Cnt(5). The time series data of oil temperature detection values Toil shown by the solid line in FIG. 6 shows that the increasing rate of the oil temperature detection value Toil changes at an intermediate point. Therefore, the oil temperature relation data RDToil shown in FIG. 8 has large variations in the count values Cnt(1) to Cnt(5).

Referring back to FIGS. 4 and 5, in step S23, the CPU 91 obtains the vehicle speed SPD, engine rotation speed NE, input shaft rotation speed Nat, a rotation speed difference ΔNtc, a heat generation amount calculated value CVtc of the lock-up clutch 75, engagement force EFtc of the lock-up clutch 75, the pack clearance PCtc of the lock-up clutch 75, and the vehicle acceleration G. The engine rotation speed NE is rotation speed of the crankshaft 11 that is calculated based on the output signal Scr of the crank angle sensor 101 and also is rotation speed of the input-side elements 78 of the lock-up clutch 75. The input shaft rotation speed Nat is rotation speed of the input shaft 81 of the transmission mechanism 80 that is calculated based on the output signal Sin of the input shaft rotational angle sensor 102 and also is rotation speed of the output-side elements 77 of the lock-up clutch 75. The rotation speed difference ΔNtc is a difference between the engine rotation speed NE and the input shaft rotation speed Nat and also is a difference in rotation speed between the input-side elements 78 and the output-side elements 77 of the lock-up clutch 75. Further, the rotation speed difference ΔNtc may also refer to a difference in rotation speed between the front cover 71, which inputs torque into the input-side elements 78, and the input shaft 81, which receives torque output from the output-side elements 77. When the lock-up clutch 75 is in the engaged state, the heat generation amount calculated value CVtc of the lock-up clutch 75 is calculated based on the product of the rotation speed difference ΔNtc and an input torque of the lock-up clutch 75. The input torque of the lock-up clutch 75 is torque that is input to the torque converter 70 from the internal combustion engine 10. When the lock-up clutch 75 is in the disengaged state, the heat generation amount calculated value CVtc is zero. The engagement force EFtc of the lock-up clutch 75 is force pushing the output-side elements 77 onto the input-side elements 78 and may be derived from the hydraulic pressure of the pressure adjustment region 70*a*. The pack clearance PCtc is a value that is measured during a shipping inspection of the transmission 40 and is prestored in the storage device 93.

In step S25, the CPU 91 assigns the oil temperature relation data RDToil generated in step S21 and the data obtained in step S23 to the input variables x(1) to x(13) of the mappings that determine whether the lock-up clutch 75 has an anomaly. More specifically, the CPU 91 assigns the count value Cnt(1) of the oil temperature relation data RDToil to the input variable x(1), assigns the count value Cnt(2) to the input variable x(2), and assigns the count value Cnt(3) to the input variable x(3). The CPU 91 assigns the count value Cnt(4) to the input variable x(4) and assigns the count value Cnt(5) to the input variable x(5). The CPU 91 assigns the vehicle speed SPD to the input variable x(6), assigns the engine rotation speed NE to the input variable x(7), and assigns the input shaft rotation speed Nat to the input variable x(8). The CPU 91 assigns the rotation speed difference ΔNtc to the input variable x(9), assigns the heat generation amount calculated value CVtc to the input variable x(10), and assigns the engagement force EFtc to the input variable x(11). The CPU 91 assigns the pack clearance PCtc to the input variable x(12) and assigns the vehicle acceleration G to the input variable x(13).

In step S27, the CPU 91 sets a determination coefficient MP to one. In step S29, the CPU 91 selects a mapping data entry that corresponds to the determination coefficient MP from the mapping data entries DM1, DM2, and DM3 stored in the storage device 93. For example, the CPU 91 selects the mapping data entry DM1 when the determination coefficient MP is one, selects the mapping data entry DM2 when the determination coefficient MP is two, and selects the mapping data entry DM3 when the determination coefficient MP is three.

In step S31, the CPU 91 inputs the input variables x(1) to x(13) into a mapping that is specified by the selected mapping data entry to calculate an output variable Y(MP).

In the present embodiment, the mapping includes a fully-connected feedforward neural network having a single intermediate layer. The above neural network includes an activation function h(x) that is used as an input-side nonlinear mapping. The input-side nonlinear mapping performs non-linear conversion on each of an input coefficient wFjk (j=0 to n, k=0 to 13) and an output of an input-side linear mapping, which is a linear mapping specified by the input coefficient wFjk. In the present embodiment, a hyperbolic tangent tanh(x) is used as an example of the activation function h(x). The above neural network also includes an activation function f(x) that is used as an output-side nonlinear mapping. The output-side nonlinear mapping performs nonlinear conversion on each of an output coefficient wSj (j=0 to n) and an output of an output-side linear mapping, which is a linear mapping specified by the output coefficient wSj. In the present embodiment, a hyperbolic tangent tanh(x) is used as the activation function f(x). A value n indicates the dimension of an intermediate layer. In the present embodiment, the value n is less than thirteen, that is, the dimension of the input variable x. The input coefficient $wFj0$ is a bias parameter and is the coefficient of an input variable $x(0)$. The input variable $x(0)$ is defined as one. The output coefficient $wS0$ is a bias parameter.

The mapping data entry DM1 is a learned model that is learned using a vehicle having the same specifications as the vehicle VC before loaded onto the vehicle VC. To learn the mapping data entry DM1, training data including supervised data and input data is obtained in advance. More specifically, time series data of oil temperature detection values Toil is obtained when the vehicle is actually traveling. When the time series data of oil temperature detection values Toil undergoes the same processes as in steps S19 and S21, the oil temperature relation data RDToil is obtained as input data. Also, at this time, the vehicle speed SPD, the vehicle speed SPD, the engine rotation speed NE, the input shaft rotation speed Nat, the rotation speed difference $\Delta Ntc$, the heat generation amount calculated value CVtc of the lock-up clutch 75, the engagement force EFtc of the lock-up clutch 75, and the vehicle acceleration G are obtained as input data. In addition, galling occurrence information, that is, information indicating whether galling has occurred in the lock-up clutch 75, is obtained as supervised data. For example, the galling occurrence information may be zero when galling has occurred, and may be one when galling has not occurred. The pack clearance PCtc of the lock-up clutch 75 loaded on the vehicle is also obtained as input data before the vehicle travels.

Training data entries are generated as the vehicle travels in various situations. For example, a lock-up clutch having the possibility that galling will occur when engaged is mounted on a vehicle, and the vehicle is driven. If galling has not occurred during the traveling of the vehicle, various types of input data entries are obtained for when galling has not occurred, and galling occurrence information indicating that galling has not occurred is also obtained as supervised data. If galling has occurred during the traveling of the vehicle, various types of input data entries are obtained for when galling has occurred, and galling occurrence information indicating that galling has occurred is also obtained.

Such training data entries are used to learn the mapping data entry DM1. More specifically, an input-side variable and an output-side variable are adjusted so that a difference between the output variable that is output from a mapping to which input data is input and the actual galling occurrence information converges on a value that is less than or equal to a predetermined value.

Also, the mapping data entry DM2 is a learned model that is learned using a vehicle having the same specifications as the vehicle VC before loaded onto the vehicle VC. To learn the mapping data entry DM2, training data including supervised data and input data is obtained in advance. More specifically, as described above, various types of input data entries are obtained when the vehicle is actually traveling. At this time, faulty engagement occurrence information, that is, information indicating whether the lock-up clutch 75 is in faulty engagement, is obtained as supervised data. For example, the faulty engagement occurrence information may be zero when the lock-up clutch 75 is in faulty engagement, and may be one when the lock-up clutch 75 is not in faulty engagement.

Training data entries that include supervised data and input data are generated as the vehicle travels in various situations. For example, a lock-up clutch having the possibility that faulty engagement will occur is mounted on a vehicle, and the vehicle is driven. When the lock-up clutch is engaged during the traveling of the vehicle, if faulty engagement has not occurred, various types of input data are obtained for when faulty engagement has not occurred, and faulty engagement occurrence information indicating that faulty engagement has not occurred is also obtained as supervised data. When the lock-up clutch is engaged during the traveling of the vehicle, if faulty engagement has occurred, various types of input data are obtained for when faulty engagement has occurred, and faulty engagement occurrence information indicating that faulty engagement has occurred is also obtained as supervised data.

Such training data entries are used to learn the mapping data entry DM2. More specifically, an input-side variable and an output-side variable are adjusted so that a difference between the output variable that is output from a mapping to which input data is input and the actual faulty engagement occurrence information converges on a value that is less than or equal to a predetermined value.

Also, the mapping data entry DM3 is a learned model that is learned using a vehicle having the same specifications as the vehicle VC before loaded onto the vehicle VC. To learn the mapping data entry DM3, training data including supervised data and input data is obtained in advance. More specifically, various types of input data entries are obtained when the vehicle is actually traveling. At this time, seizing occurrence information, that is, information indicating whether the lock-up clutch 75 has seized, is obtained as supervised data. For example, the seizing occurrence information may be zero when seizing has occurred, and may be one when seizing has not occurred.

Training data entries that include supervised data and input data are generated as the vehicle travels in various situations. For example, a lock-up clutch having the possibility that seizing will occur is mounted on a vehicle, and the vehicle is driven. When the lock-up clutch is in the disengaged state during the traveling of the vehicle, if seizing has not occurred, various types of input data are obtained for when seizing has not occurred, and seizing occurrence information indicating that seizing has not occurred is obtained as supervised data. When the lock-up clutch is in the disengaged state during the traveling of the vehicle, if seizing has occurred, various types of input data are obtained for when seizing has occurred, and seizing occurrence information indicating that seizing has occurred is obtained as supervised data.

Such training data entries are used to learn the mapping data entry DM3. More specifically, an input-side variable and an output-side variable are adjusted so that a difference between the output variable that is output from a mapping to which input data is input and the actual seizing occurrence information converges on a value that is less than or equal to a predetermined value.

After the output variable Y(MP) is calculated in step S31, the CPU 91 proceeds to step S33 and evaluates the output variable Y(MP) calculated in step S31. More specifically, the CPU 91 determines whether the lock-up clutch 75 has an anomaly based on the output variable Y(MP). For example, when the determination coefficient MP is one and the output variable Y(1) is less than or equal to an anomaly determination value, the CPU 91 determines that galling has occurred in the lock-up clutch 75. When the output variable Y(1) is greater than the anomaly determination value, the CPU 91 determines that no galling has occurred. For example, when the determination coefficient MP is two and the output variable Y(2) is less than or equal to the anomaly determination value, the CPU 91 determines that the lock-up clutch 75 is in faulty engagement. When the output variable Y(2) is greater than the anomaly determination value, the CPU 91 determines that there is no faulty engagement. For example, when the determination coefficient MP is three and the output variable Y(3) is less than or equal to the anomaly determination value, the CPU 91 determines that the lock-up clutch 75 has seized. When the output variable Y(3) is greater than the anomaly determination value, the CPU 91 determines that no seizing has occurred. As described above, when the output variable Y is less than or equal to the anomaly determination value, it may be determined that an anomaly is highly likely to have occurred in the lock-up clutch 75. Thus, it is determined that an anomaly has occurred.

In step S35, if it is determined based on the evaluation result that an anomaly has occurred in the lock-up clutch 75 (YES), the CPU 91 proceeds to step S37. In step S37, the CPU 91 stores information indicating the anomaly has occurred in the storage device 93. For example, when the output variable Y(1) is less than or equal to the anomaly determination value, the CPU 91 stores information indicating galling has occurred in the storage device 93. For example, when the output variable Y(2) is less than or equal to the anomaly determination value, the CPU 91 stores information indicating that there is faulty engagement in the storage device 93. For example, when the output variable Y(3) is less than or equal to the anomaly determination value, the CPU 91 stores information indicating seizing has occurred in the storage device 93. Then, the CPU 91 proceeds to step S39.

In step S35, if it is determined based on the evaluation result that an anomaly has not occurred in the lock-up clutch 75 (NO), the CPU 91 proceeds to step S39.

In step S39, the CPU 91 determines whether the determination coefficient MP is greater than or equal to three. When the determination coefficient MP is greater than or equal to three, all of the three anomaly determinations related to the lock-up clutch 75 have been completed. When the determination coefficient MP is less than three, one or more of the three anomaly determinations related to the lock-up clutch 75 have not been completed. Therefore, when the determination coefficient MP is less than three (S39: NO), the CPU 91 proceeds to step S41. In step S41, the CPU 91 increments the determination coefficient MP by one and then proceeds to step S29. In step S39, if the determination coefficient MP is greater than or equal to three (YES), the CPU 91 temporarily ends the series of processes.

The operation of the present embodiment will now be described.

In FIG. 6, the time series data of oil temperature detection values Toil indicated by the broken line shows changes in the oil temperature detection value Toil when the lock-up clutch 75 is shifted to the engaged state and has no anomaly. In FIG. 6, the time series data of oil temperature detection values Toil indicated by the solid line shows changes in the oil temperature detection value Toil when the lock-up clutch 75 is shifted to the engaged state and galling has occurred. In the present embodiment, when time series data of oil temperature detection values Toil is obtained, oil temperature relation data RDToil such as those shown in FIGS. 7 and 8 is generated based on the time series data of oil temperature detection values Toil. That is, the generated oil temperature relation data RDToil differs depending on whether galling has occurred during the obtainment of the time series data. More specifically, numerical magnitude of the count values Cnt(1) to Cnt(5) in the oil temperature relation data RDToil varies differently.

Also, variations in the count values Cnt(1) to Cnt(5) differ between the oil temperature relation data RDToil based on time series data of oil temperature detection values Toil obtained when the lock-up clutch 75 is in the engaged state and faulty engagement has occurred and the oil temperature relation data RDToil based on time series data of oil temperature detection values Toil obtained when no anomaly has occurred.

Also, variations in the count values Cnt(1) to Cnt(5) differ between the oil temperature relation data RDToil based on time series data of oil temperature detection values Toil obtained when the lock-up clutch 75 has seized and is shifted to the disengaged state and the oil temperature relation data RDToil based on time series data of oil temperature detection values Toil obtained when no anomaly has occurred.

When the count values Cnt(1) to Cnt(5) of the oil temperature relation data RDToil are input to the mappings specified by the mapping data entries DM1, DM2, and DM3, the mappings output the output variable Y(MP) corresponding to the oil temperature relation data RDToil. Then, it is determined whether an anomaly has occurred based on the output variable Y(MP).

The present embodiment has the following advantages.

(1-1) In the present embodiment, the storage device 93 stores the mapping data entries. Each mapping data entry specifies a mapping that receives the oil temperature relation data RDToil as an input variable and outputs an output variable Y, which determines whether the lock-up clutch 75 has an anomaly. During operation of the transmission 40, it is determined whether the lock-up clutch 75 has an anomaly based on an output variable Y that is output from the mapping as a result of inputting an obtained input variable into the mapping. This allows for determination of whether the lock-up clutch 75 has an anomaly without using a detection value of an odor sensor.

Even when a vehicle does not include an odor sensor like the vehicle VC, it is determined whether the lock-up clutch 75 of the vehicle has an anomaly.

When an anomaly detection is executed using a detection value of an odor sensor, occurrence of an anomaly cannot be detected until the components of odor emitted from oil changes as a result of deterioration of the oil. In the present embodiment, occurrence of an anomaly is detected when the oil temperature detection value Toil has changed differently. Thus, the anomaly is quickly detected.

(1-2) In the present embodiment, time series data of oil temperature detection values Toil is normalized to obtain time series data of normalized oil temperature detection values ToilN including multiple normalized oil temperature detection values ToilN. Then, the oil temperature relation data RDToil is generated based on time series data of the normalized oil temperature detection values ToilN. Therefore, the degree of difference in the oil temperature relation data RDToil between when the lock-up clutch 75 has an anomaly and when the lock-up clutch 75 has no anomaly subtly changes between when the oil temperature detection value Toil is relatively large and when the oil temperature detection value Toil is relatively small. Thus, the use of the oil temperature relation data RDToil as an input variable of the mapping reduces variations in the determination accuracy caused by the magnitude of oil temperature detection values Toi.

(1-3) As the number of data entries increases in time series data of normalized oil temperature detection values ToilN, the accuracy of the determination is increased. In the present embodiment, the oil temperature relation data RDToil, which is an input variable of a mapping, is a histogram of time series data of normalized oil temperature detection values ToilN. Thus, even when the number of data entries increases in the time series data, the data volume of the oil temperature relation data RDToil is not greatly increased. The determination is executed with high accuracy even when a small volume of data is used.

(1-4) The operating amount of the transmission 40 at a relatively high vehicle speed SPD differs from the operating amount of the transmission 40 at a relatively low vehicle speed SPD. When the operating amount of the transmission 40 changes, the temperature of oil circulating in the transmission 40 also changes. In this regard, in the present embodiment, the vehicle speed SPD is used as an input variable of a mapping. That is, the mapping outputs an output variable Y considering the vehicle speed SPD. When such an output variable Y is used to determine whether the lock-up clutch 75 has an anomaly, the determination accuracy is increased.

(1-5) When the lock-up clutch 75 has no anomaly and is in the engaged state, changes in the oil temperature may be estimated to some degree. Also, changes in the oil temperature when the lock-up clutch 75 is in the disengaged state, changes in the oil temperature when the operating state is shifted from the disengaged state to the engaged state, and changes in the oil temperature when the operational state is shifted from the engaged state to the disengaged state may be estimated to some degree.

The vehicle speed SPD determines a point in time when the lock-up clutch 75 is shifted from the disengaged state to the engaged state and a point in time when the lock-up clutch 75 is shifted from the engaged state to the disengaged state. That is, the operating state of the lock-up clutch 75 is controlled based on the vehicle speed SPD. Therefore, whether the lock-up clutch 75 has an anomaly is assumed by comparing changes in the oil temperature estimated from the operating state of the lock-up clutch 75, which is determined by the vehicle speed SPD, with changes in the oil temperature detection value Toil.

As in the present embodiment, when the vehicle speed SPD is added to the input variable of a mapping, the accuracy of determining whether the lock-up clutch 75 has an anomaly is increased.

(1-6) For example, when the lock-up clutch 75 is in the engaged state, the amount of heat generated by the lock-up clutch 75 may vary in accordance with the rotation speed of the input-side elements 78, the rotation speed of the output-side elements 77, and the rotation speed difference between the input-side elements 78 and the output-side elements 77. In the present embodiment, the engine rotation speed NE, which corresponds to the rotation speed of the input-side elements 78, the input shaft rotation speed Nat, which corresponds to the rotation speed of the output-side elements 77, and the rotation speed difference ΔNtc are used as input variables of a mapping. That is, the mapping outputs an output variable Y considering the engine rotation speed NE, the input shaft rotation speed Nat, and the rotation speed difference ΔNtc. When such output variables Y are used to determine whether the lock-up clutch 75 has an anomaly, the accuracy of the determination is increased.

(1-7) The heat generation amount calculated value CVtc of the lock-up clutch 75 is calculated based on the assumption that the lock-up clutch 75 has no an anomaly. Therefore, the relationship between the heat generation amount calculated value CVtc and changes in the oil temperature detection value Toil may differ between when the lock-up clutch 75 has an anomaly and when the lock-up clutch 75 has no anomaly. In this regard, in the present embodiment, the heat generation amount calculated value CVtc is used as an input variable of a mapping. That is, the mapping outputs an output variable Y considering the heat generation amount calculated value CVtc. When such an output variable Y is used to determine whether there is an anomaly, the determination accuracy is increased.

(1-8) When the lock-up clutch 75 is in the engaged state, the heat generation amount of the lock-up clutch 75 may differ between when the engagement force EFtc is relatively large and when the engagement force EFtc is relatively small. For example, when the engagement force EFtc is relatively small and the lock-up clutch 75 is in sliding engagement, the lock-up clutch 75 generates a larger amount of heat than when the engagement force EFtc is relatively large and the lock-up clutch 75 is in complete engagement. In this regard, in the present embodiment, the engagement force EFtc is used as an input variable of a mapping. That is, the mapping outputs an output variable Y considering the engagement force EFtc. When such an output variable Y is used to determine whether the lock-up clutch 75 has an anomaly, the accuracy of the determination is increased.

(1-9) As the pack clearance PCtc of the lock-up clutch 75 is increased in amount, engagement force that shifts the lock-up clutch 75 to the engaged state tends to be increased. That is, when the lock-up clutch 75 is in the engaged state, the heat generation amount of the lock-up clutch 75 may vary in accordance with the amount of the pack clearance PCtc. In this regard, in the present embodiment, the pack clearance PCtc is used as an input variable of a mapping. That is, the mapping outputs an output variable Y considering the pack clearance PCtc. When such an output variable Y is used to determine whether the lock-up clutch 75 has an anomaly, the accuracy of the determination is increased.

(1-10) When the lock-up clutch 75 is shifted from the disengaged state to the engaged state or shifted from the engaged state to the disengaged state, changes in the operating state of the lock-up clutch 75 generate vibration in the transmission 40. Such vibration may be detected by the acceleration sensor 105. The vehicle acceleration G, which is a detection value of the acceleration sensor 105, may differ between when the lock-up clutch 75 has an anomaly and when the lock-up clutch 75 has no anomaly. In the present embodiment, the vehicle acceleration G is used as an input variable of a mapping. That is, the mapping outputs an output variable Y considering the vehicle acceleration G. When such an output variable Y is used to determine whether there is an anomaly, the determination accuracy is increased.

(1-11) The amount of heat generated by the lock-up clutch 75 differs between when galling has occurred in the lock-up clutch 75 and when galling has not occurred in the lock-up clutch 75. That is, the oil temperature detection value Toil changes differently. Therefore, when an input variable is input to a mapping that is specified by the mapping data entry DM1, the output variable Y output from the mapping is used to determine whether galling has occurred.

(1-12) When the lock-up clutch 75 is shifted to the engaged state, the amount of heat generated by the lock-up clutch 75 differs between when the lock-up clutch 75 is in faulty engagement and when the lock-up clutch 75 is not in faulty engagement. That is, the oil temperature detection value Toil changes differently. Therefore, when an input variable is input to a mapping that is specified by the mapping data entry DM2, the output variable Y output from the mapping is used to determine whether there is faulty engagement.

(1-13) When the lock-up clutch 75 has seized, the lock-up clutch 75 cannot be shifted to the disengaged state. The amount of heat generated by the lock-up clutch 75 differs between when seizing has occurred in the lock-up clutch 75 and when seizing has not occurred in the lock-up clutch 75. That is, the oil temperature detection value Toil changes differently. Therefore, when an input variable is input to a mapping that is specified by the mapping data entry DM3, the output variable Y output from the mapping is used to determine whether seizing has occurred.

(1-14) In the present embodiment, the mapping data entries DM1, DM2, and DM3 are prepared for each type of anomaly of the lock-up clutch 75. The mapping data entry DM1 is used to determine whether galling has occurred. The mapping data entry DM2 is used to determine whether faulty engagement has occurred. The mapping data entry DM3 is used to determine whether the seizing has occurred. Thus, the accuracy of each determination is increased by separately using the mapping data entries DM1, DM2, and DM3 in accordance with the type of determination.

Second Embodiment

A second embodiment will be described below with reference to the drawings. The differences from the first embodiment will mainly be discussed.

Figure 9:
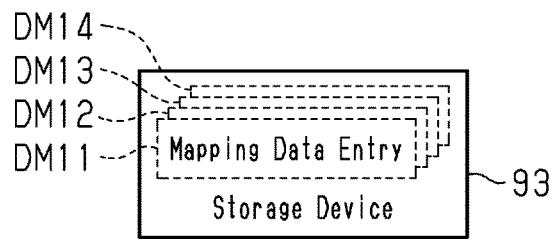
FIG. 9 is a block diagram showing a storage device of a controller in a second embodiment.

As shown in FIG. 9, in the present embodiment, the storage device 93 stores mapping data entries DM11, DM12, DM13, DM14 that separately correspond to each operating state of the lock-up clutch 75. The mapping data entry DM11 is learned through machine learning that is specific to when the operating state of the lock-up clutch 75 is a disengaged state. The mapping data entry DM12 is learned through machine learning that is specific to when the operating state of the lock-up clutch 75 is a transitional engaging state. The mapping data entry DM13 is learned through machine learning that is specific to when the operating state of the lock-up clutch 75 is an engaged state. The mapping data entry DM14 is learned through machine learning that is specific to when the operating state of the lock-up clutch 75 is a transitional disengaging state. The transitional engaging state refers to an operating state of the lock-up clutch 75 when shifting from the disengaged state to the engaged state. The transitional disengaging state refers to an operating state of the lock-up clutch 75 when shifting from the engaged state to the disengaged state.

Figure 10:
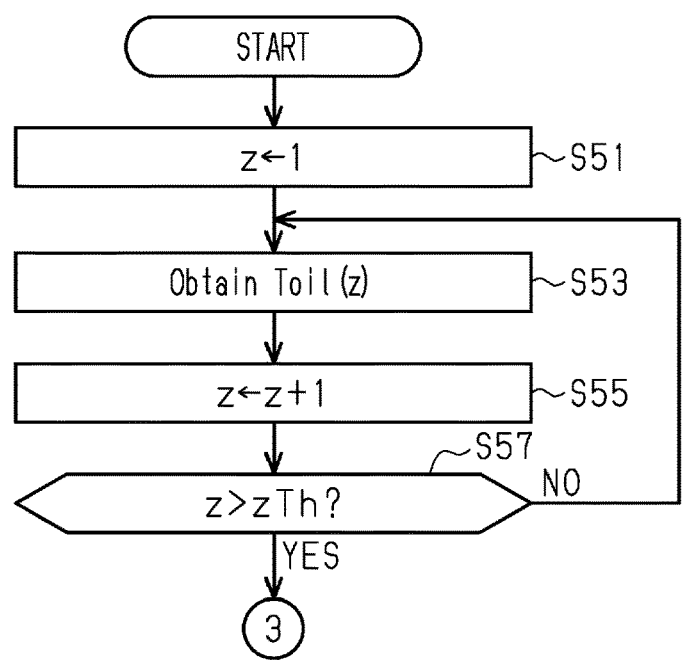
FIG. 10 is the first half of a flowchart showing a series of processes executed by the controller.
Figure 11:
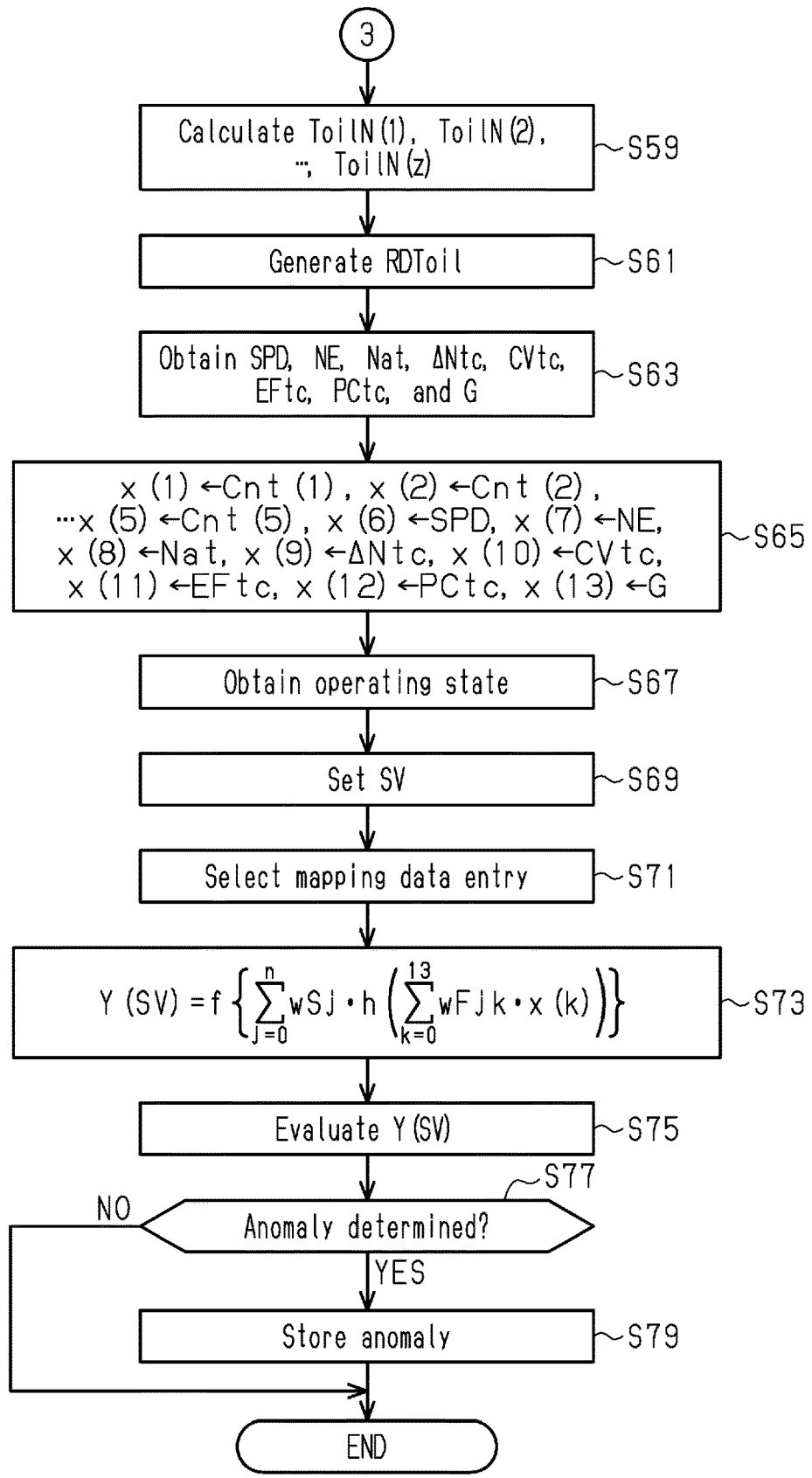
FIG. 11 is the second half of a flowchart showing a series of processes executed by the controller.

The procedure of a series of processes executed by the controller 90 for determining whether the lock-up clutch 75 has an anomaly will now be described with reference to FIGS. 10 and 11. The series of processes shown in FIGS. 10 and 11 is implemented by the CPU 91 when executing the programs stored in the ROM 92. The series of processes is repeatedly executed in a predetermined cycle. More specifically, when a time elapsed from when the series of processes temporarily ends reaches the time corresponding to the predetermined cycle, the CPU 91 again starts to execute the series of processes.

In step S51, the CPU 91 sets a coefficient z to one. Next, in step S53, the CPU 91 obtains the present oil temperature detection value Toil as an oil temperature detection value Toil(z). Next, in step S55, the CPU 91 increments the coefficient z by one. In step S57, the CPU 91 determines whether the coefficient z is greater than a coefficient determination value zTh. If the coefficient z is less than or equal to the coefficient determination value zTh (S57: NO), the CPU 91 proceeds to step S53. If the coefficient z is greater than the coefficient determination value zTh (S57: YES), the CPU 91 proceeds to step S59.

In step S59, in the same manner as in step S19, the CPU 91 obtains time series data of normalized oil temperature detection values ToilN including multiple normalized oil temperature detection values ToilN(1), ToilN(2), . . . , and ToilN(z). In step S61, in the same manner as in step S21, the CPU 91 generates oil temperature relation data RDToil based on the time series data of the normalized oil temperature detection values ToilN. In step S63, in the same manner as in step S23, the CPU 91 obtains the vehicle speed SPD, engine rotation speed NE, input shaft rotation speed Nat, a rotation speed difference ΔNtc, a heat generation amount calculated value CVtc of the lock-up clutch 75, engagement force EFtc of the lock-up clutch 75, the pack clearance PCtc of the lock-up clutch 75, and the vehicle acceleration G. In step S65, in the same manner as in step S25, the CPU 91 assigns the oil temperature relation data RDToil calculated in step S61 and the data obtained in step S63 to the input variables x(1) to x(13) of the mappings that determine whether the lock-up clutch 75 has an anomaly.

In step S67, the CPU 91 obtains the operating state of the lock-up clutch 75. More specifically, the CPU 91 selects the present operating state of the lock-up clutch 75 from the disengaged state, the transitional engaging state, the engaged state, and the transitional disengaging state. "The present operating state of the lock-up clutch 75" refers to an operating state obtained by the CPU 91 based on control. Hence, when the lock-up clutch 75 has an anomaly, the obtained operating state may differ from the actual operating state.

In step S69, the CPU 91 sets a state coefficient SV to a value corresponding to the operating state obtained in step S67. For example, when the operating state is the disengaged state, the CPU 91 sets the state coefficient SV to one. When the operating state is the transitional engaging state, the CPU 91 sets the state coefficient SV to two. For example, when the operating state is the engaged state, the CPU 91 sets the state coefficient SV to three. When the operating state is the transitional disengaging state, the CPU 91 sets the state coefficient SV to four.

In step S71, the CPU 91 selects a mapping data entry corresponding to the state coefficient SV from the mapping data entries DM11, DM12, DM13, and DM14 stored in the storage device 93. For example, when the state coefficient SV is one, the CPU 91 selects the mapping data entry DM11. When the state coefficient SV is two, the CPU 91 selects the mapping data entry DM12. When the state coefficient SV is three, the CPU 91 selects the mapping data entry DM13. When the state coefficient SV is four, the CPU 91 selects the mapping data entry DM14.

In step S73, the CPU 91 inputs the input variables x(1) to x(13) into a mapping that is specified by the selected mapping data entry to calculate an output variable Y(SV).

The mapping data entry DM11 is a learned model that is learned using a vehicle having the same specifications as the vehicle VC before loaded onto the vehicle VC. To learn the mapping data entry DM11, training data including supervised data and input data is obtained in advance. More specifically, various types of input data entries are obtained when the lock-up clutch is in the disengaged state and the vehicle is driven. In addition, anomaly occurrence information, that is, information indicating whether the lock-up clutch has an anomaly, is obtained as supervised data. In the present embodiment, the types of anomaly, that is, galling, faulty engagement, and seizing, are not distinguished from each other. For example, when an anomaly has occurred in the lock-up clutch, the anomaly occurrence information may be zero, and when no anomaly has occurred in the lock-up clutch, anomaly determination information may be one.

Training data entries are generated as the vehicle travels in various situations. For example, a lock-up clutch having the possibility that an anomaly will occur is mounted on a vehicle, and the vehicle is driven. If no anomaly has occurred during the traveling of the vehicle, various types of input data entries are obtained for when no anomaly has occurred, and anomaly occurrence information indicating that no anomaly has occurred is also obtained as supervised data. If an anomaly has occurred during the traveling of the vehicle, various types of input data entries are obtained for when the anomaly has occurred, and anomaly occurrence information indicating that the anomaly has occurred is also obtained as supervised data.

Such training data entries are used to learn the mapping data entry DM11. More specifically, an input-side variable and an output-side variable are adjusted so that a difference between an output variable that is output from a mapping to which input data is input and the actual anomaly determination information converges on a value that is less than or equal to a predetermined value.

Also, each of the mapping data entries DM12, DM13, and DM14 is a learned model that is learned using a vehicle having the same specifications as the vehicle VC before loaded onto the vehicle VC. To learn the mapping data entry DM12, input data is obtained based on various types of data obtained when the vehicle is traveling and the lock-up clutch is in the transitional engaging state, and the corresponding anomaly occurrence information is obtained as supervised data. As described above, training data entries are generated. Such training data entries are used to learn the mapping data entry DM12. More specifically, an input-side variable and an output-side variable are adjusted so that a difference between the output variable that is output from a mapping to which input data is input and the actual anomaly determination information converges on a value that is less than or equal to a predetermined value.

To learn the mapping data entry DM13, input data is obtained based on various types of data obtained when the vehicle is traveling and the lock-up clutch is in the engaged state, and the corresponding anomaly occurrence information is obtained as supervised data. As described above, training data entries are generated. Such training data entries are used to learn the mapping data entry DM13. More specifically, an input-side variable and an output-side variable are adjusted so that a difference between an output variable that is output from a mapping to which input data is input and the actual anomaly determination information converges on a predetermined value.

To learn the mapping data entry DM14, input data is obtained based on various types of data obtained when the vehicle is traveling and the lock-up clutch is in the transitional disengaging state, and the corresponding anomaly occurrence information is obtained as supervised data. As described above, training data entries are generated. Such training data entries are used to learn the mapping data entry DM14. More specifically, an input-side variable and an output-side variable are adjusted so that a difference between the output variable that is output from a mapping to which input data is input and the actual anomaly determination information converges on a value that is less than or equal to a predetermined value.

In step S75, the CPU 91 evaluates the output variable Y(SV) calculated in step S73. More specifically, the CPU 91 determines whether the output variable Y(SV) is less than or equal to the anomaly determination value. If the output variable Y(SV) is less than or equal to the anomaly determination value, the CPU 91 determines that an anomaly has occurred in the lock-up clutch 75. If the output variable Y(SV) is greater than the anomaly determination value, the CPU 91 determines that no anomaly has occurred in the lock-up clutch 75. In step S77, if it is determined based on the evaluation result that an anomaly has occurred in the lock-up clutch 75 (YES), the CPU 91 proceeds to step S79. In step S79, the CPU 91 stores information indicating the anomaly has occurred in the storage device 93. Subsequently, the CPU 91 temporarily ends the series of processes.

In step S77, if it is determined based on the evaluation result that no anomaly has occurred in the lock-up clutch 75 (NO), the CPU 91 temporarily ends the series of processes. That is, for example, when the output variable Y(SV) is greater than the anomaly determination value, the CPU 91 does not execute step S79 and temporarily ends the series of processes.

In addition to the advantages (1-1) to (1-10) described above, the present embodiment has the following advantage.

(2-1) Even when the lock-up clutch 75 has an anomaly, changes in the oil temperature detection value Toil may differ if the operating state of the lock-up clutch 75 differs. In this regard, in the present embodiment, the mapping data entries DM11, DM12, DM13, and DM14 that separately correspond to each operating state of the lock-up clutch 75 are prepared in advance. A mapping data entry that corresponds to the present operating state is selected from the mapping data entries DM11, DM12, DM13, and DM14, and an input variable is input to a mapping that is specified by the selected mapping data entry. Then, it is determined whether the lock-up clutch 75 has an anomaly based on the output variable Y(SV) that is output from the mapping. Thus, the determination accuracy is increased by separately using the mapping data entries in accordance with the operating state.

Third Embodiment

A third embodiment will be described below with reference to the drawings. The differences from the first and second embodiments will mainly be discussed.

Figure 12:
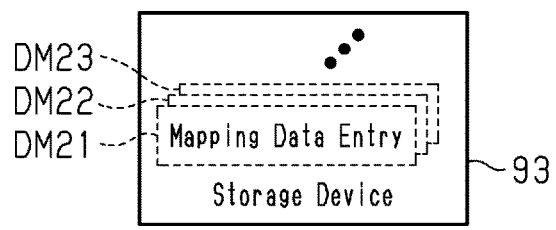
FIG. 12 is a block diagram showing a storage device of a controller in a third embodiment.

As shown in FIG. 12, in the present embodiment, the storage device 93 stores mapping data entries DM21, DM22, DM23, and so on corresponding to a degree of deterioration in the characteristics of the transmission 40. The mapping data entry DM11 corresponds to the smallest degree of the characteristic deterioration. The mapping data entry DM12 corresponds to the second smallest degree of the characteristic deterioration. The mapping data entry DM13 corresponds to the third smallest degree of the characteristic deterioration.

Figure 13:
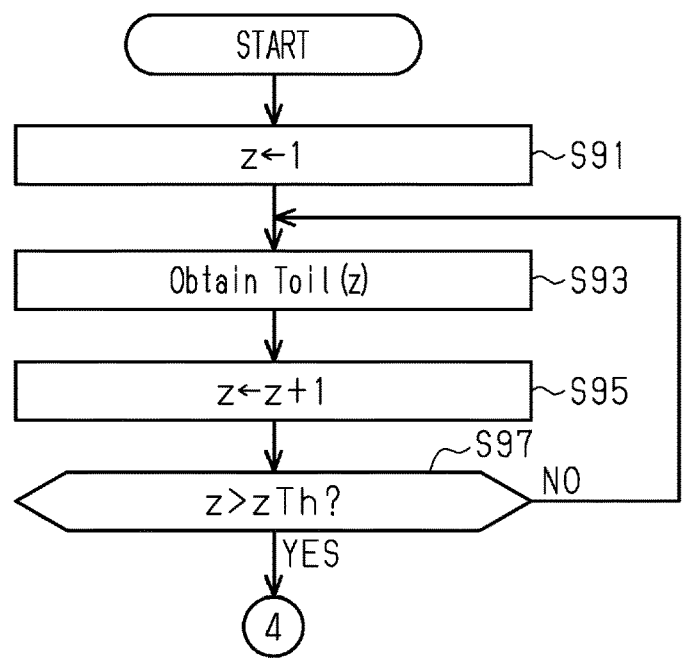
FIG. 13 is the first half of a flowchart showing a series of processes executed by the controller.
Figure 14:
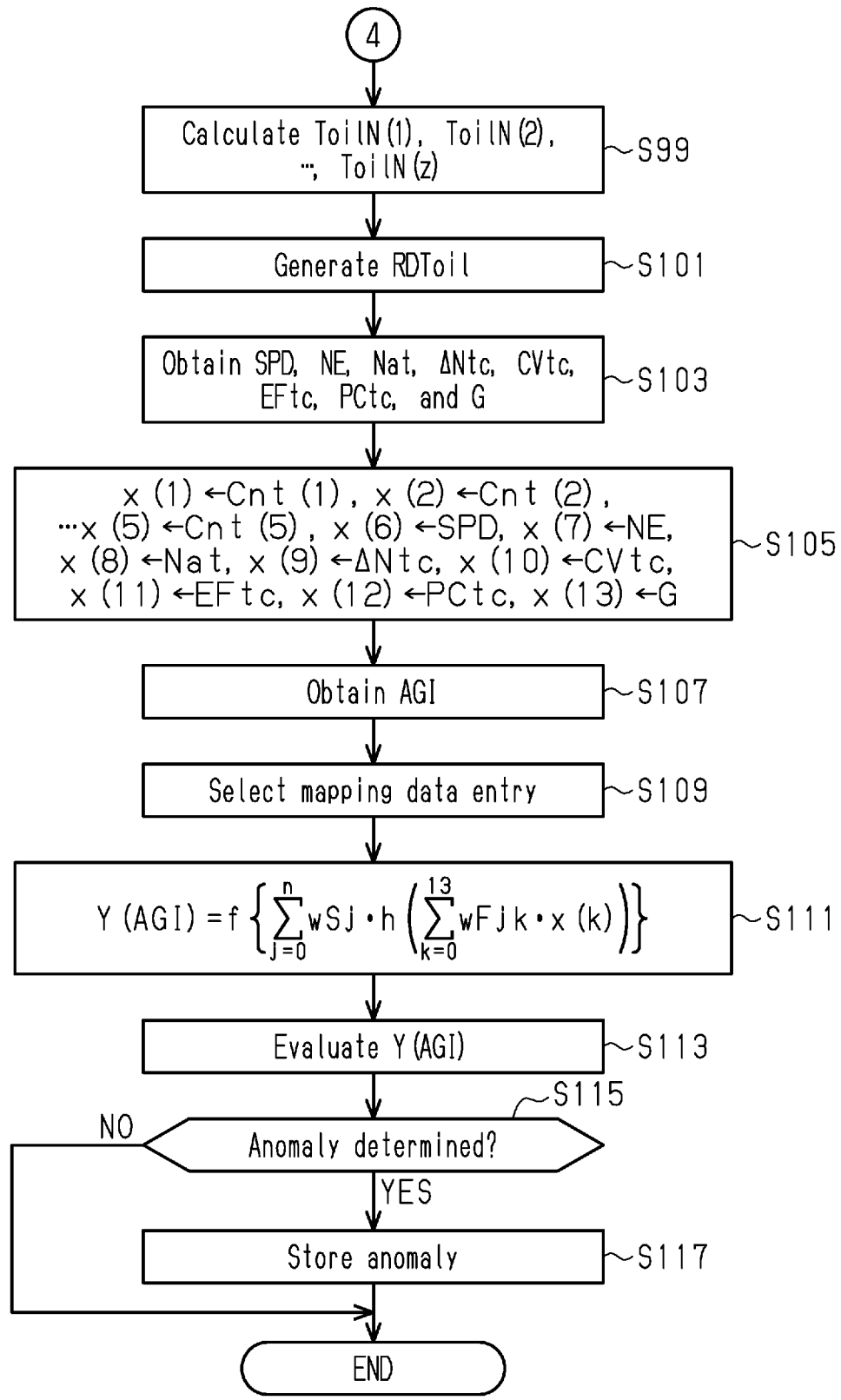
FIG. 14 is the second half of the flowchart showing the series of processes executed by the controller.

The procedure of a series of processes executed by the controller 90 for determining whether the lock-up clutch 75 has an anomaly will now be described with reference to FIGS. 13 and 14. The series of processes shown in FIGS. 13 and 14 is implemented by the CPU 91 when executing the programs stored in the ROM 92. The series of processes is repeatedly executed in a predetermined cycle. More specifically, when a time elapsed from when the series of processes temporarily ends reaches the time corresponding to the predetermined cycle, the CPU 91 again starts to execute the series of processes.

In step S91, the CPU 91 sets a coefficient z to one. Next, in step S93, the CPU 91 obtains the present oil temperature detection value Toil as an oil temperature detection value Toil(z). Next, in step S95, the CPU 91 increments the coefficient z by one. In step S97, the CPU 91 determines whether the coefficient z is greater than a coefficient determination value zTh. If the coefficient z is less than or equal to the coefficient determination value zTh (S97: NO), the CPU 91 proceeds to step S93. If the coefficient z is greater than the coefficient determination value zTh (S97: YES), the CPU 91 proceeds to step S99.

In step S99, in the same manner as in step S19, the CPU 91 obtains time series data of normalized oil temperature detection values ToilN including multiple normalized oil temperature detection values ToilN(1), ToilN(2), . . . , and ToilN(z). In step S101, in the same manner as in step S21, the CPU 91 generates oil temperature relation data RDToil based on the time series data of normalized oil temperature detection values ToilN. In step S103, in the same manner as in step S23, the CPU 91 obtains the vehicle speed SPD, engine rotation speed NE, input shaft rotation speed Nat, a rotation speed difference $\Delta$Ntc, a heat generation amount calculated value CVtc of the lock-up clutch 75, engagement force EFtc of the lock-up clutch 75, the pack clearance PCtc of the lock-up clutch 75, and the vehicle acceleration G. In step S105, in the same manner as in step S25, the CPU 91 assigns the oil temperature relation data RDToil calculated in step S101 and the data obtained in step S103 to the input variables x(1) to x(13) of the mappings that determine whether the lock-up clutch 75 has an anomaly.

In step S107, the CPU 91 obtains a deterioration coefficient AGI, which is a coefficient corresponding to deterioration in the characteristics of the transmission 40. For example, the CPU 91 obtains the deterioration coefficient AGI based on the travelled distance of the vehicle VC. In this case, the CPU 91 may set the deterioration coefficient AGI to a value that increases as the travelled distance of the vehicle VC becomes longer.

In step S109, the CPU 91 selects a mapping data entry corresponding to the deterioration coefficient AGI from the mapping data entries DM21, DM22, DM23, stored in the storage device 93. For example, when the deterioration coefficient AGI is one, the CPU 91 selects the mapping data entry DM21. When the deterioration coefficient AGI is two, the CPU 91 selects the mapping data entry DM22.

In step S111, the CPU 91 inputs the input variables x(1) to x(13) into a mapping that is specified by the selected mapping data entry to calculate an output variable Y(AGI).

The mapping data entry DM21 is a learned model that is learned using a vehicle having the same specifications as the vehicle VC before loaded onto the vehicle VC. To learn the mapping data entry DM21, training data including supervised data and input data is obtained in advance. More specifically, various types of input data entries are obtained by actually driving a vehicle, the travelled distance of which corresponds to the deterioration coefficient AGI being one. In addition, anomaly occurrence information, that is, information indicating whether the lock-up clutch has an anomaly, is obtained as supervised data. In the present embodiment, the types of anomaly, that is, galling, faulty engagement, and seizing, are not distinguished from each other. For example, when an anomaly has occurred in the lock-up clutch, the anomaly occurrence information may be zero, and when no anomaly has occurred in the lock-up clutch, anomaly determination information may be one.

Training data entries are generated as the vehicle travels in various situations. For example, a lock-up clutch having the possibility that an anomaly will occur is mounted on a vehicle, and the vehicle is driven. If no anomaly has occurred during the traveling of the vehicle, various types of input data entries are obtained for when no anomaly has occurred, and anomaly occurrence information indicating that no anomaly has occurred is also obtained as supervised data. If an anomaly has occurred during the traveling of the vehicle, various types of input data entries are obtained for when the anomaly has occurred, and anomaly occurrence information indicating that the anomaly has occurred is also obtained as supervised data.

Such training data entries are used to learn the mapping data entry DM21. More specifically, an input-side variable and an output-side variable are adjusted so that a difference between the output variable that is output from a mapping to which input data is input and the actual anomaly determination information converges on a value that is less than or equal to a predetermined value.

Also, each of the mapping data entries DM22, DM23, . . . is a learned model that is learned using a vehicle having the same specifications as the vehicle VC before loaded onto the vehicle VC. To learn the mapping data entry DM22, various types of input data entries are obtained by actually driving a vehicle, the travelled distance of which corresponds to the deterioration coefficient AGI being two. Also, the corresponding anomaly occurrence information is obtained as supervised data. As a result, training data entries including the input data and the supervised data are generated. Such training data entries are used to learn the mapping data entry DM22. More specifically, an input-side variable and an output-side variable are adjusted so that a difference between the output variable that is output from a mapping to which input data is input and the actual anomaly determination information converges on a value that is less than or equal to a predetermined value.

To learn the mapping data entry DM23, various types of input data entries are obtained by actually driving a vehicle, the travelled distance of which corresponds to the deterioration coefficient AGI being three. Also, the corresponding anomaly occurrence information is obtained as supervised data. As a result, training data entries including the input data and the supervised data are generated. Such training data entries are used to learn the mapping data entry DM23. More specifically, an input-side variable and an output-side variable are adjusted so that a difference between the output variable that is output from a mapping to which input data is input and the actual anomaly determination information converges on a value that is less than or equal to a predetermined value.

In step S113, the CPU 91 evaluates the output variable Y(AGI) calculated in step S111. More specifically, the CPU 91 determines whether the output variable Y(AGI) is less than or equal to the anomaly determination value. If the output variable Y(AGI) is less than or equal to the anomaly determination value, the CPU 91 determines that an anomaly has occurred in the lock-up clutch 75. If the output variable Y(AGI) is greater than the anomaly determination value, the CPU 91 determines that no anomaly has occurred in the lock-up clutch 75. In step S115, if it is determined based on the evaluation result that an anomaly has occurred in the lock-up clutch 75 (YES), the CPU 91 proceeds to step S117. In step S117, the CPU 91 stores information indicating the anomaly has occurred in the storage device 93. Subsequently, the CPU 91 temporarily ends the series of processes.

In step S115, if it is determined based on the evaluation result that no anomaly has occurred in the lock-up clutch 75 (NO), the CPU 91 temporarily ends the series of processes. That is, for example, when the output variable Y(AGI) is greater than the anomaly determination value, the CPU 91 does not execute step S117 and temporarily ends the series of processes.

In addition to the advantages (1-1) to (1-10) described above, the present embodiment has the following advantage.

(3-1) Even when the transmission 40 has no anomaly, the heat generation amount of the transmission 40 may change in accordance with the degree of deterioration in the characteristics of the transmission 40. In this regard, in the present embodiment, the mapping data entries DM21, DM22, DM23, . . . that correspond to the degree of deterioration in the characteristics of the transmission 40 are prepared in advance. From the mapping data entries DM21, DM22, DM23, . . . , a mapping data entry that corresponds to the present degree of deterioration in the characteristics is selected, and an input variable is input to a mapping that is specified by the selected mapping data entry. Then, it is determined whether the lock-up clutch 75 has an anomaly based on the output variable Y(AGI) that is output from the mapping. Thus, the determination accuracy is increased by separately using the mapping data entries in accordance with the degree of deterioration in the characteristics.

Correspondence Relationship

Correspondence relationship between the items in the embodiments described above and the items described in SUMMARY is as follows. Hereinafter, the correspondence relationship is shown with each number of the aspects described in SUMMARY.

[1] The anomaly determination device corresponds to the controller 90. The power source of the vehicle corresponds to the internal combustion engine 10. The driving wheel corresponds to the driving wheel 60. The power transmission device corresponds to the transmission 40. The frictional engagement element corresponds to the lock-up clutch 75. The oil temperature sensor corresponds to the oil temperature sensor 103. The vehicle corresponds to the vehicle VC. An execution device, that is, the processing circuitry, corresponds to the CPU 91 and the ROM 92. The storage device corresponds to the storage device 93. The oil temperature detection value corresponds to the oil temperature detection value Toil. The oil temperature relation data corresponds to the oil temperature relation data RDToil. The mapping data entries correspond to the mapping data entries DM1, DM2, and DM3 shown in FIG. 1, the mapping data entries DM11, DM12, DM13, and DM14 shown in FIG. 9, and the mapping data entries DM21, DM22, DM23, . . . shown in FIG. 12. The obtainment process corresponds to each process of steps S13 to S23 shown in FIGS. 4 and 5, each process of steps S53 to S63 shown in FIGS. 10 and 11, and each process of steps S93 to S103 shown in FIGS. 13 and 14. The anomaly determination process corresponds to each process of steps S27 to S41 shown in FIGS. 4 and 5, each process of steps S73 to S79 shown in FIGS. 10 and 11, and each process of steps S111 to S117 shown in FIGS. 13 and 14.

[2] The detection value obtainment process corresponds to each process of steps S13 to S17 shown in FIG. 4, each process of steps S53 to S57 shown in FIGS. 10 and 11, and each process of steps S93 to S97 shown in FIGS. 13 and 14. The relation data generation process corresponds to each process of steps S19 and S21 shown in FIGS. 4 and 5, each process of steps S59 and S61 shown in FIGS. 10 and 11, and each process of steps S99 and S101 shown in FIGS. 13 and 14.

[3] The normalized oil temperature detection value corresponds to the normalized oil temperature detection value ToilN.

[4] The vehicle speed corresponds to the vehicle speed SPD.

[5] The clutch corresponds to the lock-up clutch 75. The input-side element corresponds to the input-side element 78. The output-side element corresponds to the output-side element 77. The rotation speed of the input-side element corresponds to the engine rotation speed NE. The rotation speed of the output-side element corresponds to the input shaft rotation speed Nat. The rotation speed difference between the input-side element and the output-side element corresponds to the rotation speed difference ΔNtc.

[6] The input portion corresponds to the front cover 71. The output portion corresponds to the input shaft 81. The input-output rotation speed difference corresponds to the rotation speed difference ΔNtc. The calculated value of the heat generation amount corresponds to the heat generation amount calculated value CVtc.

[7] The engagement force corresponds to the engagement force EFtc.

[8] The pack clearance corresponds to the pack clearance PCtc.

[9] The acceleration sensor corresponds to the acceleration sensor 105. The detection value of the acceleration sensor corresponds to the vehicle acceleration G.

[10] The anomaly determination process corresponds to each process of steps S31 to S37 shown in FIGS. 4 and 5 when the determination coefficient MP is one.

[11] The anomaly determination process corresponds to each process of steps S31 to S37 shown in FIGS. 4 and 5 when the determination coefficient MP is two.

[12] The anomaly determination process corresponds to each process of steps S31 to S37 shown in FIGS. 4 and 5 when the determination coefficient MP is three.

[13] The first mapping data entry corresponds to the mapping data entry DM1. The second mapping data entry corresponds to the mapping data entry DM2. The third mapping data entry corresponds to the mapping data entry DM3.

[14] The first mapping data entry corresponds to one of the mapping data entries DM11, DM12, DM13, and DM14. The second mapping data entry corresponds to one of the mapping data entries DM11, DM12, DM13, and DM14 excluding the first mapping data entry. The data selection process corresponds to step S71 shown in FIGS. 10 and 11. The anomaly determination process corresponds to each process of steps S73 to S79 shown in FIGS. 10 and 11.

[15] The mapping data entries correspond to the mapping data entries DM21, DM22, DM23, . . . . The data selection process corresponds to step S109 shown in FIGS. 13 and 14. The anomaly determination process corresponds to each process of steps S111 to S117 shown in FIGS. 13 and 14.

Modified Examples

The embodiments may be modified as follows. The embodiments and the following modified examples can be combined as long as the combined modified examples remain technically consistent with each other.

Mapping

In the embodiments, the activation function of a mapping is illustrative and thus is not restrictive. For example, a logistic sigmoid function may be used as the activation function of a mapping.

In the embodiments, a neural network having a single intermediate layer is used as the neural network. However, the neural network may include two or more intermediate layers.

In the embodiments, a fully-connected feedforward neural network is used as the neural network. Instead, for example, a recurrent connection-type neural network may be used as the neural network. As will be described, a recurrent connection-type neural network may be used when time series data of normalized oil temperature detection values ToilN and time series data of oil temperature detection values Toil are used as input variables of a mapping instead of the oil temperature relation data RDToil.

Mapping Data Entry

In the second embodiment, the mapping specified by each of the mapping data entries DM11, DM12, DM13, and DM14 may be configured to output an output variable that distinguishes the type of anomaly of the lock-up clutch 75. In this case, the value of the output variable corresponds to the type of the anomaly, that is, occurrence of galling, faulty engagement, and seizing.

In the third embodiment, the mapping specified by each of the mapping data entries DM21, DM22, DM23, . . . may be configured to output an output variable that distinguishes the type of anomaly of the lock-up clutch 75. In this case, the value of the output variable corresponds to the type of the anomaly, that is, occurrence of galling, faulty engagement, and seizing.

In this case, information related to the probability that galling has occurred, information related to the probability that faulty engagement has occurred, and information related to the probability that seizing has occurred are input to an output layer of the mapping. The output layer outputs an output variable Y that corresponds to each piece of the input information.

In the first embodiment, the storage device 93 may store a single mapping data entry that has been learned through machine learning so that any of the determination of whether galling has occurred in the lock-up clutch 75, the determination of whether faulty engagement will occur in the lock-up clutch 75, and the determination of whether the lock-up clutch 75 have seized is executable. This configuration eliminates the need for switching mapping data entries in accordance with the type of determination.

In addition, when the storage device 93 stores only a single mapping data entry as described above, the mapping data entry may be learned so as not to distinguish the type of anomaly.

In the first embodiment, as long as the mapping data entry DM1 is stored in the storage device 93, the mapping data entries DM2 and DM3 do not have to be stored in the storage device 93. Even in this case, whether galling has occurred in the lock-up clutch 75 is determined.

In the first embodiment, as long as the mapping data entry DM2 is stored in the storage device 93, the mapping data entries DM1 and DM3 do not have to be stored in the storage device 93. Even in this case, whether the lock-up clutch 75 is in faulty engagement is determined.

In the first embodiment, as long as the mapping data entry DM3 is stored in the storage device 93, the mapping data entries DM1 and DM2 do not have to be stored in the storage device 93. Even in this case, whether seizing has occurred in the lock-up clutch 75 is determined.

Input Variable

The input variable does not have to include the vehicle acceleration G.

The input variable does not have to include the pack clearance PCtc.

The input variable does not have to include the engagement force EFtc.

When the transmission 40 includes a sensor configured to detect the engagement force EFtc or a correlation value of the engagement force EFtc, a detection value of the sensor may be used as the engagement force EFtc.

The input variable does not have to include the heat generation amount calculated value CVtc.

When the transmission 40 includes a sensor configured to detect the heat generation amount of the lock-up clutch 75 or a correlation value of the heat generation amount, a detection value of the sensor may be used as the input variable.

When the engine rotation speed NE, that is, the rotation speed of the input-side elements 78, is used as the input variable, the input variable does not have to include the input shaft rotation speed Nat, that is, the rotation speed of the output-side elements 77. Also, the input variable does not have to include the rotation speed difference ΔNtc.

When the input shaft rotation speed Nat, that is, the rotation speed of the output-side elements 77, is used as the input variable, the input variable does not have to include the engine rotation speed NE, that is, the rotation speed of the input-side elements 78. Also, the input variable does not have to include the rotation speed difference ΔNtc.

When the rotation speed difference ΔNtc is used as the input variable, the input variable does not have to include the engine rotation speed NE, that is, the rotation speed of the input-side elements 78. Also, the input variable does not have to include the input shaft rotation speed Nat, that is, the rotation speed of the output-side elements 77.

Instead of using the rotation speed difference ΔNtc, a rotation speed ratio, that is, a ratio of the input shaft rotation speed Nat to the engine rotation speed NE, may be used as an input variable.

The input variable does not include any of the engine rotation speed NE, that is, the rotation speed of the input-side elements 78, the input shaft rotation speed Nat, that is, the rotation speed of the output-side elements 77, and the rotation speed difference ΔNtc.

The input variable does not have to include the vehicle speed SPD.

Anomaly Determination Process

In the first embodiment, the storage device 93 may be configured to store information indicating that an anomaly has occurred in the lock-up clutch 75 any of when it is determined that galling has occurred, when it is determined that faulty engagement has occurred, and when it is determined that seizing has occurred. More specifically, as long as the storage device 93 stores information indicating that an anomaly has occurred, the type of the anomaly does not have to be stored in the storage device 93.

Oil Temperature Relation Data

In the embodiments, the oil temperature relation data RDToil includes the five count values Cnt(1) to Cnt(5). However, the number of count values is not limited to five. For example, when the range of numeral values from zero to one is split at intervals of 0.1, the oil temperature relation data RDToil may include ten count values Cnt(1) to Cnt(10).

Oil temperature relation data used as an input variable of a mapping does not have to be the oil temperature relation data RDToil. For example, the oil temperature relation data may be time series data of normalized oil temperature detection values ToilN.

The oil temperature relation data may be time series data of oil temperature detection values Toil.

Deterioration Degree

In the third embodiment, the degree of deterioration in the characteristics of the transmission 40 is estimated based on the travelled distance of the vehicle VC. Instead, the degree of deterioration in the characteristics of the transmission 40 may be estimated, for example, based on the number of times the lock-up clutch 75 has been operated or the total time of the operating state of the lock-up clutch 75 having been in the engaged state.

Execution Device

The execution device is not limited to a device that includes the CPU 91 and the ROM 92 and executes the software processes. For example, a dedicated hardware circuit may be provided to execute at least part of the software processing executed in each of the above-described embodiments. An example of a dedicated hardware circuit is an ASIC. ASIC is the abbreviation of an application specific integrated circuit. More specifically, the execution device may have any one of the following configurations (a) to (c). Configuration (a) includes a processor that executes all of the above-described processes in accordance with programs and a program storage device such as a ROM that stores the programs. Configuration (b) includes a processor that execute some of the above-described processes in accordance with programs, a program storage device, a dedicated hardware circuit that executes the remaining processes. Configuration (c) includes a dedicated hardware circuit that executes all of the above-described processes. Multiple software execution devices each including a processor and a program storage device and multiple dedicated hardware circuits may be provided. That is, the above-described processes may be executed by processing circuitry that includes at least one of one or more software execution devices or one or more dedicated hardware circuits. The program storage device, that is, a computer readable medium, includes any medium that can be accessed from a general-purpose computer or a dedicated computer.

Power Transmission Device

The power transmission device is not limited to a stepped transmission and may be any device including a frictional engagement element. The power transmission device may be, for example, a continuously variable transmission.

Frictional Engagement Element

The frictional engagement element is not limited to the lock-up clutch 75. The frictional engagement element may be, for example, the first clutch C1, the second clutch C2, or the brake mechanism B1 of the transmission mechanism 80.

The frictional engagement element is not limited to an element that is shifted to the engaged state and the disengaged state by adjustment of hydraulic pressure. The frictional engagement element may be shifted to the engaged state and the disengaged state, for example, by adjustment of electromagnetic force or by being driven by an electric motor.

Vehicle

The vehicle may be a hybrid vehicle. The vehicle may be a vehicle that includes a motor generator but does not include an internal combustion engine. In this case, the motor generator corresponds to the power source of the vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An anomaly determination device for a power transmission device, wherein the anomaly determination device is used for a vehicle including the power transmission device and an oil temperature sensor, the power transmission device includes a frictional engagement element and is configured to transmit power output from a power source of the vehicle to a driving wheel, and the oil temperature sensor is configured to detect an oil temperature, which is a temperature of oil circulating in the power transmission device, the anomaly determination device comprising:

processing circuitry; and
a storage device, wherein
the storage device stores a mapping data entry that specifies a mapping and includes data learned through machine learning,
a detection value of the oil temperature sensor is an oil temperature detection value,
when oil temperature relation data, which is data corresponding to time series data of the oil temperature detection value, is input to the mapping as an input variable, the mapping outputs an output variable that determines whether the frictional engagement element has an anomaly,
the processing circuitry is configured to execute
an obtainment process that obtains the input variable, and
an anomaly determination process that determines whether the frictional engagement element has the anomaly based on the output variable that is output from the mapping as a result of inputting the input variable obtained in the obtainment process into the mapping.

2. The anomaly determination device according to claim 1, wherein the obtainment process includes
a detection value obtainment process that obtains the time series data of the oil temperature detection value including multiple of the oil temperature detection value that are detected in each detection cycle within a predetermined measurement period, and
a relation data generation process that normalizes the multiple of the oil temperature detection value included in the time series data of the oil temperature detection value to generate the oil temperature relation data.

3. The anomaly determination device according to claim 2, wherein
a value obtained by normalizing the oil temperature detection value is a normalized oil temperature detection value, and
in the relation data generation process, the processing circuitry is configured to normalize the multiple of the oil temperature detection value included in the time series data of the oil temperature detection value to derive time series data of the normalized oil temperature detection value including multiple of the normalized oil temperature detection value and generate, as the oil temperature relation data, data showing distribution of numerical magnitude of the multiple of the normalized oil temperature detection value included in time series data of the normalized oil temperature detection value.

4. The anomaly determination device according to claim 1, wherein the input variable includes a vehicle speed.

5. The anomaly determination device according to claim 1, wherein
the power transmission device includes a clutch as the frictional engagement element, and
the input variable includes at least one of a rotation speed of an input-side element of the clutch, a rotation speed of an output-side element of the clutch, or a rotation speed difference between the input-side element and the output-side element.

6. The anomaly determination device according to claim 1, wherein
an input-output rotation speed difference is a rotation speed difference between an input portion that inputs torque to the frictional engagement element and an output portion that receives torque output from the frictional engagement element, and
the input variable includes a calculated value of a heat generation amount of the frictional engagement element that is calculated based on the product of torque input to the frictional engagement element and the input-output rotation speed difference.

7. The anomaly determination device according to claim 1, wherein the input variable includes an engagement force of the frictional engagement element.

8. The anomaly determination device according to claim 1, wherein the input variable includes a pack clearance of the frictional engagement element.

9. The anomaly determination device according to claim 1, wherein the input variable includes a detection value of an acceleration sensor mounted on the vehicle.

10. The anomaly determination device according to claim 1, wherein
the mapping outputs the output variable, which determines whether galling has occurred in the frictional engagement element, and
in the anomaly determination process, the processing circuitry is configured to determine whether the galling has occurred in the frictional engagement element based on the output variable that is output from the mapping as a result of inputting the input variable obtained in the obtainment process into the mapping.

11. The anomaly determination device according to claim 1, wherein
the mapping outputs the output variable, which determines whether the frictional engagement element is in faulty engagement, and
in the anomaly determination process, the processing circuitry is configured to determine whether the frictional engagement element is in the faulty engagement based on the output variable that is output from the mapping as a result of inputting the input variable obtained in the obtainment process into the mapping.

12. The anomaly determination device according to claim 1, wherein
the mapping outputs the output variable, which determines whether seizing has occurred in the frictional engagement element, and
in the anomaly determination process, the processing circuitry is configured to determine whether the seizing has occurred in the frictional engagement element based on the output variable that is output from the mapping as a result of inputting the input variable obtained in the obtainment process into the mapping.

13. The anomaly determination device according to claim 1, wherein
the storage device stores mapping data entries,
the mapping data entries include a first mapping data entry, a second mapping data entry, and a third mapping data entry,
the first mapping data entry specifies a mapping that outputs a first output variable that determines whether galling has occurred in the frictional engagement element when the input variable is input,
the second mapping data entry specifies a mapping that outputs a second output variable that determines whether the frictional engagement element is in faulty engagement when the input variable is input, and
the third mapping data entry specifies a mapping that outputs a third output variable that determines whether seizing has occurred in the frictional engagement element when the input variable is input.

14. The anomaly determination device according to claim 1, wherein
the storage device stores mapping data entries separately corresponding to each operating state of the frictional engagement element,
the mapping data entries include a first mapping data entry and a second mapping data entry,
the first mapping data entry specifies a mapping that outputs the output variable that determines whether the frictional engagement element has the anomaly when the oil temperature relation data corresponding to the operating state of the frictional engagement element being a first operating state is input into the mapping as the input variable,
the second mapping data entry specifies a mapping that outputs the output variable that determines whether the frictional engagement element has the anomaly when the oil temperature relation data corresponding to the operating state of the frictional engagement element being a second operating state that differs from the first operating state is input into the mapping as an input variable,
the processing circuitry is configured to execute a data selection process that selects the mapping data entry corresponding to the operating state of the frictional engagement element from the mapping data entries stored in the storage device, and
in the anomaly determination process, the processing circuitry is configured to determine whether the frictional engagement element has the anomaly based on the output variable that is output from the mapping specified by the mapping data entry selected in the data selection process as a result of inputting the input variable obtained in the obtainment process into the mapping.

15. The anomaly determination device according to claim 1, wherein
the storage device stores mapping data entries corresponding to a degree of deterioration in characteristic of the power transmission device,
the processing circuitry is configured to execute a data selection process that selects the mapping data entry corresponding to the degree of deterioration in characteristic of the power transmission device from the mapping data entries stored in the storage device, and
in the anomaly determination process, the processing circuitry is configured to determine whether the frictional engagement element has the anomaly based on the output variable that is output from the mapping specified by the mapping data entry selected in the data selection process as a result of inputting the input variable obtained in the obtainment process into the mapping.

* * * * *